US012710815B1

(12) United States Patent
Peacock et al.

(10) Patent No.: US 12,710,815 B1
(45) Date of Patent: Aug. 18, 2026

(54) DISPLAY COLOR BREAKUP REDUCTION DURING EYE MOVEMENT

(71) Applicant: Snap Inc., Santa Monica, CA (US)

(72) Inventors: Candace Elise Peacock, Boulder, CO (US); Katherine Elizabeth Mussel, Longmont, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/086,938

(22) Filed: Mar. 21, 2025

(51) Int. Cl.
*G06F 3/01* (2006.01)

(52) U.S. Cl.
CPC .................................... *G06F 3/013* (2013.01)

(58) Field of Classification Search
CPC .............. G02B 27/017; G02B 27/0172; G02B 2027/0178; G06F 3/013; G06F 3/011
See application file for complete search history.

(56) References Cited

U.S. PATENT DOCUMENTS 8,970,495 B1 3/2015 Biffle et al.
9,946,073 B2 4/2018 Petrov
10,942,564 B2 3/2021 Young et al.
12,118,655 B2 10/2024 Meina et al.
2016/0022137 A1* 1/2016 Wetzel ................. A61B 5/4082 600/558
2019/0204910 A1* 7/2019 Held ....................... G06T 11/60
2020/0058256 A1* 2/2020 Seibert .................... G06F 3/017
2020/0273426 A1* 8/2020 Gollier ............... G02B 27/0081
2023/0225611 A1* 7/2023 Kapoula .................. A61B 3/08 251/203

FOREIGN PATENT DOCUMENTS

CN 118262680 A 6/2024

OTHER PUBLICATIONS

Henderson, John M., "Differential Detection Of Global Luminance And Contrast Changes Across Saccades And Flickers During Active Scene Perception", Science Direct Vision Research 48, Apr. 2007, 14 pgs.

(Continued)

*Primary Examiner* — Matthew A Eason
*Assistant Examiner* — Chayce R Bibbee
(74) *Attorney, Agent, or Firm* — Schwegman Lundberg & Woessner, P.A.

(57) ABSTRACT

Examples relate to display systems and techniques for reducing visual artifacts in field sequential color displays. A system includes a field sequential color display device that presents visual content according to a first display configuration, and an eye tracking subsystem that detects rapid eye movements. The system predicts a duration of a detected rapid eye movement and temporarily modifies display parameters during the predicted duration according to a second display configuration that reduces color breakup artifacts. The second configuration can include reducing content opacity through optical filter control, adjusting display brightness or contrast, or modifying color data at region boundaries to use monochromatic colors. After the predicted duration, the system returns to presenting content according to the first display configuration. The prediction of movement duration utilizes relationships between peak velocity and acceleration profiles of eye movements to overcome eye tracking and display latency constraints.

20 Claims, 19 Drawing Sheets

(56) References Cited

OTHER PUBLICATIONS

Johnson, Paul V., "The Visibility Of Color Breakup And A Means To Reduce It", Journal Of Vision, Dec. 2014, 13 pgs.
Lin, Fang-Cheng, "Color Breakup Suppression Based On Global Dimming For Field Sequential Color Displays Using Edge Information In Images", Optics Express vol. 27 No. 3, Feb. 2019, 9 pgs.
Lin, Fang-Cheng, "Color-Breakup Suppression And Low-Power Consumption By Using The Stencil-FSC Method In Field-Sequential LCDs", Journal Of The SID, 2009, 8 pgs.
Lin, Fang-Cheng, "Color Breakup Reduction By 180 Hz Stencil-FSC Method In Large-Sized Color Filter-Less LCDs", Journal Of Display Technology vol. 6 No. 3, Mar. 2010, 6 pgs.
Qin, Zong, "A Review Of Color Breakup Assessment For Field Sequential Color Display", Information Display Frontline Technology vol. 35 Issue 2, Mar. 2019, 8 pgs.
Yohso, Aya, "How Color Break-Up Occurs In The Human Visual-System The Mechanism Of The Color Break-Up Phenomenon", Society For Information Display, Jun. 2006, 7 pgs.
Zhang, Xuemei, "Sequential Color Breakup Measured With Induced Saccades", Human Vision And Electronic Imaging VIII, Jun. 2003, 8 pgs.
Huang, Yi-Pai Bounds, et al., "Suppressing color breakup in LCDs", SPIE, the international society for optics and photonics, (Aug. 29, 2008), 5 pgs.
"International Application Serial No. PCT/US2026/019939, International Search Report mailed Jun. 30, 2026", 3 pgs.
"International Application Serial No. PCT/US2026/019939, Written Opinion mailed Jun. 30, 2026", 10 pgs.

* cited by examiner

DISPLAY COLOR BREAKUP REDUCTION DURING EYE MOVEMENT

TECHNICAL FIELD

The present disclosure relates to display devices and systems and, in some examples, to algorithms and systems to reduce color breakup artifacts in field sequential color displays during rapid eye movements. More particularly, the disclosure relates to techniques for detecting and predicting rapid eye movements to dynamically adjust display parameters of field sequential color (FSC) displays of extended reality (XR) devices to improve visual quality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects or other content (e.g., virtual objects such as 3D renderings, images, video, text, and so forth) that are generated for display to appear as a part of, and/or overlaid upon, the surrounding environment (referred to collectively as "virtual content"). This is typically referred to as "extended reality" or "XR", and it encompasses techniques such as augmented reality (AR), virtual reality (VR), and mixed reality (MR). Each of these technologies combines aspects of the physical world with virtual content presented to a user.

Field sequential color (FSC) displays operate by transmitting primary colors, such as red (R), green (G), and blue (B), in successive single-color images, relying on the human visual system to fuse these sequential color subframes into a complete full-color frame or image. For example, in a modern field sequential displays running at a full color frame rate of 120 Hz (120 full color frames per second), each individual color (R,G,B) runs at 120 Hz (120 red color sub-frames per second, 120 green, and 120 blue), resulting in a total refresh rate of 360 Hz across all three colors. FSC displays can be implemented using any suitable emitter and/or image former technology, such as liquid crystal displays (LCDs), liquid crystal on silicon (LCoS) displays, light emitting diode (LED) displays, organic LED (OLED) displays, microLED displays, and so on.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
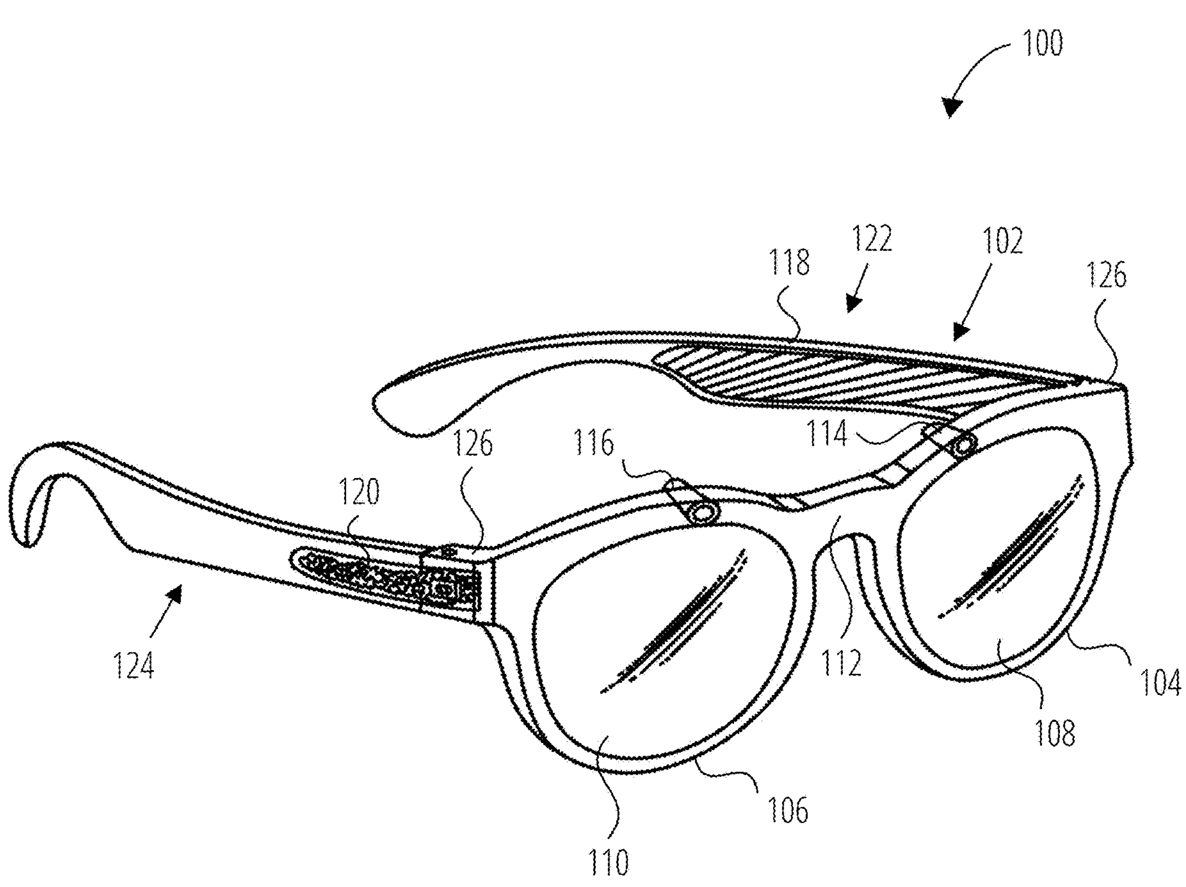
FIG. 1 is a perspective view of a head-worn device, in accordance with some examples.

Examples described herein seek to address visual artifacts that occur in field sequential color (FSC) displays during rapid eye movements, known as saccades. As noted above, field sequential color displays operate by presenting red, green, and blue primary colors in successive monochrome images at high refresh rates, typically 120 Hz per color for a total refresh rate of 360 Hz. The human visual system normally fuses these sequential color subframes into complete full-color images.

During saccades, which occur approximately three times per second as users explore their visual world, the sequential monochrome images can fall at different positions on the retina, resulting in visible color breakup and/or other motion artifacts. Saccadic suppression is a perceptual phenomenon in which conscious awareness of changes in the visual field during saccades is suppressed by the brain; thus, saccadic suppression might be expected to minimize these artifacts. However, studies have shown that color breakup remains perceptible during saccades.

Examples are described herein of systems and methods for controlling an FSC display to reduce the perception of color breakup during rapid eye movements. Examples may use an eye tracking system to track eye movements, and to adjust the display of visual content on the FSC display device during saccades to reduce perceptible color breakup and/or other motion artifacts.

In some examples, a head-worn extended reality device with a transparent or semi-transparent field sequential color display allows users to view both the surrounding environment and overlaid virtual content. An eye tracking subsystem monitors the user's gaze direction and eye movement patterns. To address color breakup and/or other motion artifacts, the system can reduce the opacity, brightness, and/or contrast of the virtual content during detected saccades. This can be accomplished by reducing the optical filter opacity in see-through displays, decreasing projector LED power, or modifying RGB values of the rendered content.

In some examples, the system can also modify regions of virtual content to display monochromatic colors at border portions between different colored regions. This involves identifying regions and their boundaries based on color data, determining the nearest primary color for border portions, and modifying border portions to use only the nearest primary color to the original color of the border portion as defined in a color space (such as red-green-blue (RGB) or hue-saturation-value (HSV)).

The system processes eye gaze data to determine angular velocity and detects saccade onset when velocity exceeds a threshold, such as 30-50 degrees per second. It can be configured to predict saccade duration using various techniques, such as peak velocity detection and main sequence relationships, peak acceleration/deceleration profile analysis, and/or machine learning approaches.

The system applies corrections after detecting saccade onset, maintains corrections during the predicted duration, and returns display parameters to normal before saccade completion or offset. The corrections are particularly relevant for larger saccades (e.g., >10 degrees of angular change in the gaze vector), where color breakup and/or other motion artifacts are most noticeable. For smaller saccades (e.g., <5 degrees of angular change in the gaze vector), the artifacts are less detectable and corrections may not be necessary.

Studies suggest that users are highly insensitive to luminance and contrast changes during saccades, indicating that the temporary display modifications should not be noticeable, despite their effectiveness in reducing color breakup and/or other motion artifacts.

Whereas examples are described herein in reference to a head-mounted XR display device and system using a pair of near-eye FSC display devices, it will be appreciated that the described techniques can be applied to any FSC display system with the capability to track a user's gaze. Because saccades occur in both eyes in tandem, some examples may track either one or both eyes, and can use this eye tracking data to modify the operation of either a display that presents visual content to both of a user's eyes, such as a conventional desktop or laptop computer display or a mobile device display, or two near-eye displays of a stereoscopic display system.

FIG. 1 is perspective view of a head-worn XR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100. In some examples, the optical elements 108 and 110 include an optical filter as described below with reference to FIG. 3. In some examples, the optical elements 108, 110 include additional components, such as eye tracking sensors and/or other optical sensors as described below with reference to FIG. 5.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. Various other examples may include these elements in different configurations or integrated together in different ways. In some examples, the computer 120 can be implemented according to the machine 1700 illustrated in FIG. 17. In some examples, the computer 120 can be implemented as a machine 1804 executing software according to the software architecture 1802 shown in FIG. 18.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116, such as one or more eye tracking sensors, environmental light sensors, and/or other optical sensors as described below. Such sensors or input/output devices can additionally include location sensors, motion sensors, and so forth. It will be appreciated that the cameras 114, 116 are a form of optical sensor, and that the glasses 100 may include additional types of optical sensors in some examples.

Figure 2:
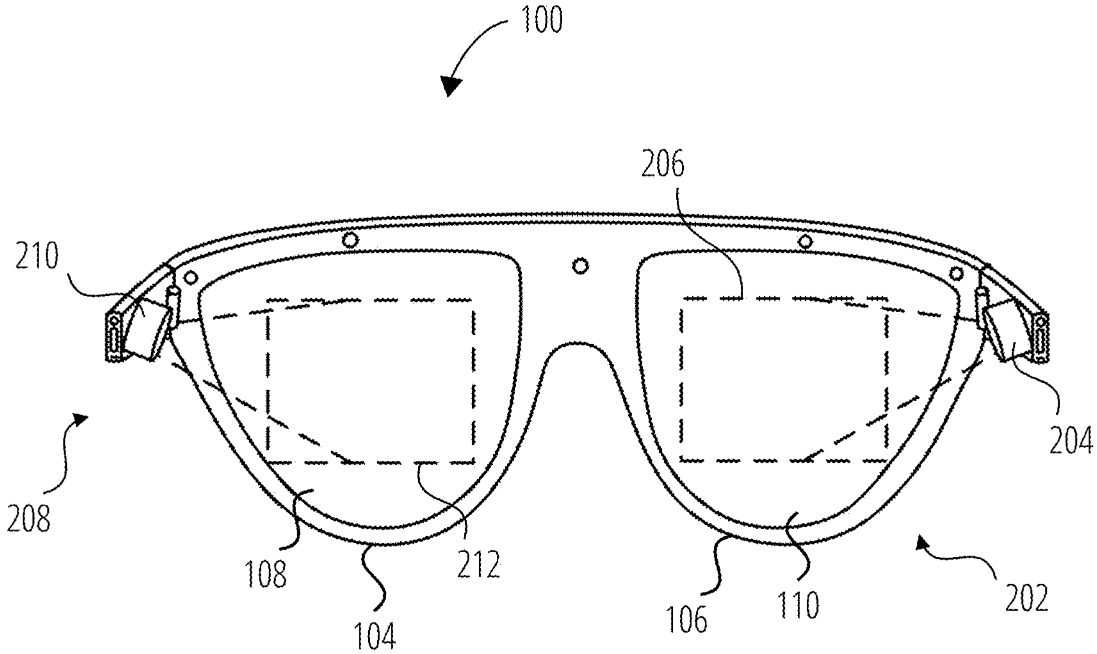
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include right forward optical assembly 202 comprising a right projector 204 and a right display device 206, and a left forward optical assembly 208 including a left projector 210 and a left display device 212. The right forward optical assembly 202 may also be referred to herein, by itself or in combination with one or both of the respective optical elements 108 and 110, as a near-eye optical see-through XR display.

In some examples, the display devices 206 are waveguides. The waveguides include reflective or diffractive structures (e.g., gratings and/or optical elements such as mirrors, lenses, or prisms). Projected light 314 emitted by the projector 204 encounters the diffractive structures of the waveguide of the display device 206, which directs the light towards the right eye of a user to provide an image on or in the right optical element 110 that overlays the view of the real world seen by the user. Similarly, projected light 314 emitted by the projector 210 encounters the diffractive structures of the waveguide of the display device 212, which directs the light towards the left eye of a user to provide an image on or in the left optical element 108 that overlays the view of the real world seen by the user. The combination of a GPU, the right forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100. The surface of the optical element 108 or 110 from which the projected light exits toward the user's eye is referred to as a user-facing surface or an image presentation surface of the near-eye optical see-through XR display.

It will be appreciated that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various 3D user interfaces on the near eye displays. As described in more detail herein, the user can then interact with the glasses 100 using the buttons 126, voice inputs or touch inputs on an associated device, and/or hand movements, locations, and positions detected by the glasses 100. In some examples, as described below, a user may also provide control input to the glasses 100 using eye gestures tracked by an eye tracking subsystem.

In some examples, one or more further optical lenses may be used to adjust the presentation of the virtual content to the user's eye. For example, lenses can be placed on the user-facing side and/or the exterior side of the display device (e.g., display device 206 or 212) to modulate the plane in front of the user's eye where that the virtual content appears, i.e., to adjust the perceived distance of the virtual content from the user's eye. The near user-facing side lens affects the perceived distance of the virtual content in front of the user; while the exterior side lens is provided to neutralize the effect of the near side lens on real-world objects. In some examples, an ophthalmic lens can be positioned on the user-facing side of the display device (e.g., display device 206 or 212) to allow users needing visual correction to correctly perceive the virtual content. It will be appreciated that examples described herein can be combined with various XR display or other display designs.

Figure 3:
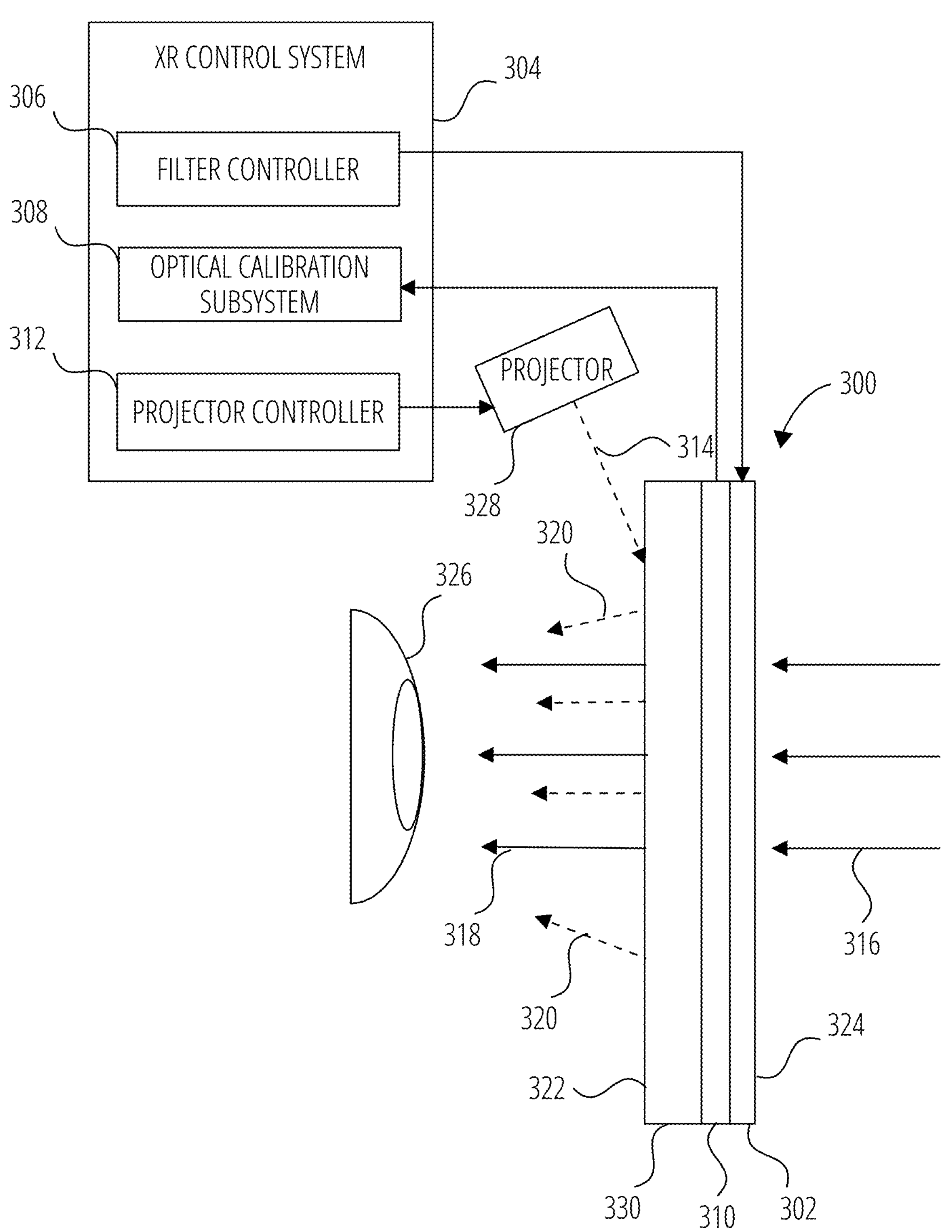
FIG. 3 is a simplified cross-sectional view of an example XR display having an optical filter, in accordance with some examples.

FIG. 3 is a simplified cross-sectional view of an example XR display 300 having an optical filter 302.

The XR display 300 includes an optical filter 302 having a filter surface 324 located on a world-facing side of the XR display 300 and an image presentation component 330 having an image presentation surface 322. A projector 328 is used to project virtual visual content for presentation via the image presentation surface 322 of the image presentation component 330. The projected light 314 emitted by the projector 328 is propagated via the image presentation component 330 to be presented as presented light 320 to the user's eye 326 at various locations across the image presentation surface 322. The optical filter 302 has a variable optical transmittance at various points across the filter surface 324. Thus, the optical filter 302 is operable to selectively modulate an amount of environmental light 316 passing through the optical filter 302 at each of multiple locations (such as points or regions) defined across the filter surface 324. The environmental light 316 is thereby filtered by the optical filter 302, passing out of the user-facing side of the XR display 300 as filtered environmental light 318.

In the illustrated example, the XR display 300 also includes an optical calibration sensor 310 positioned between the image presentation component 330 and the optical filter 302. The optical calibration sensor 310 is configured to detect light propagating within or out of the image presentation component 330 at various locations defined across the image presentation surface 322. In some examples, the optical calibration sensor 310 may be an optically sensitive sensor, such as an optically sensitive semi-transparent film. In some examples, the optical calibration sensor 310 may be positioned in a different location from that shown in FIG. 3, such as on the user-facing side of the image presentation component 330. In some examples, the optical calibration sensor 310 may be replaced or supplemented by another sensor suitable for detecting characteristics of light passing out of the image presentation surface 322 at various points across the image presentation surface 322, such as a camera or other optical sensor positioned on the glasses 100 (e.g., on the temple piece 122 or 124, or on one of the optical element holders 104 or 106) to detect the presented light 320 (and, in some examples, the filtered environmental light 318 as well). The optical calibration sensor 310 captures information about the characteristics of the presented light 320 in order to determine the actual distribution of presented light 320 across the image presentation surface 322, which may diverge from an intended distribution of light based on the image data driving the projector 328, due to distortions introduced by or between the projector 328 and the XR display 300 as a result of mechanical perturbation, thermal expansion, or other sources of distortion. The information captured by the optical calibration sensor 310 can then be used either to validate or confirm the intended distribution of light, and/or to detect deviation from the intended distribution of light and calibrate the projector 328 and/or the operation of the XR display 300, as described below.

The components of the XR display 300 are controlled by an XR control system 304, including a filter controller 306 for controlling the optical filter 302, an optical calibration subsystem 308 for receiving and processing data from the optical calibration sensor 310, and a projector controller 312 for controlling the projector 328.

In some examples, the optical filter 302 includes one or more electrochromic filters or liquid crystal (LC) based filters capable of being electrically controlled by application of an electrical signal across the area of the optical filter 302. The filter controller 306 is operable to modulate these electrical signals to control the light filtering properties of the optical filter 302. In some examples, a given electrochromic filter or LC-based filter can be adjusted as to its optical transmittance across the visible light spectrum (e.g., the degree to which it decreases the overall luminance or lightness of the filtered environmental light 318 relative to the environmental light 316). In examples described herein, the optical filter 302 is nonuniform in its light filtering properties, and different regions of the optical filter 302 are independently controllable.

In some examples, the LC-based filter is a bistable liquid crystal filter that uses bistable LC elements to dynamically control the amount of light that is propagated through the LC elements. Because bistable liquid crystal displays require low or no power draw to maintain a fixed degree of optical transmittance, some examples may use a bistable liquid crystal filter to implement the optical filter 302 while reducing the power requirements of other active filter types, such as electrochromic filters. In some examples, non-LC bistable filters may be used, such as bistable electrophoretic materials suspending tinted particles of elements that are moved to a filtering position or orientation by application of an electrical signal. It will be appreciated that various technologies may be used to implement the optical filter 302 in different examples.

Whereas, in the illustrated example, the optical filter 302 includes one or more electrochromic filters or LC-based filters, it will be appreciated that some examples may include other types of active optical filters controlled by other means, such as photochromic filters configured to adjust their light filtering properties in response to penetration by light, and/or thermochromic filters configured to adjust their light filtering properties in response to heat. In some examples, a photochromic filter may be actively controlled by the projection of light from a light source; however, in other examples, the photochromic filter reacts automatically to the properties of the environmental light 316 by adjusting its own light filtering properties. In some examples, a thermochromic filter is controlled using a heating element as part of the filter controller 306.

In some examples, the ambient light levels (e.g., characteristics of the environmental light 316) can be sensed by ambient light sensors, such as the cameras 114 and/or 116 and/or other optical sensors of the glasses 100, and the optical filter 302 and/or the projector 328 can be controlled based on those detected properties of the environmental light 316, as described in greater detail below. In some examples, one or both cameras 114 and/or 116 can determine the characteristics of environmental light 316 entering various regions of the area of the XR display 300, and different regions of the area of the optical filter 302 can be dynamically adjusted based on the specific light patterns passing through those regions. In some examples, the function of detecting characteristics of environmental light 316 passing through different regions across the area of the XR display 300 may be performed by the optical calibration sensor 310.

In some examples, the properties of the environmental light 316 can be determined based on environmental light data received from sources other than the optical sensors of the glasses 100 (including the cameras 114 and 116 and/or other environment sensors and/or ambient light sensors). For example, expected lighting conditions of a building or geographical area may be determined based on location data, weather data, remote optical sensors in communication with the glasses 100 over a network, or other data sources, and the optical filter 302 and/or projector 328 may be controlled based at least in part on the processing of such data.

It will be appreciated, given the shape of the eye 326 as shown in the simplified diagram of FIG. 3, that eye 326 may correspond to only a portion of the user's eyeball, such as the corneal region including the pupil.

Figure 4:
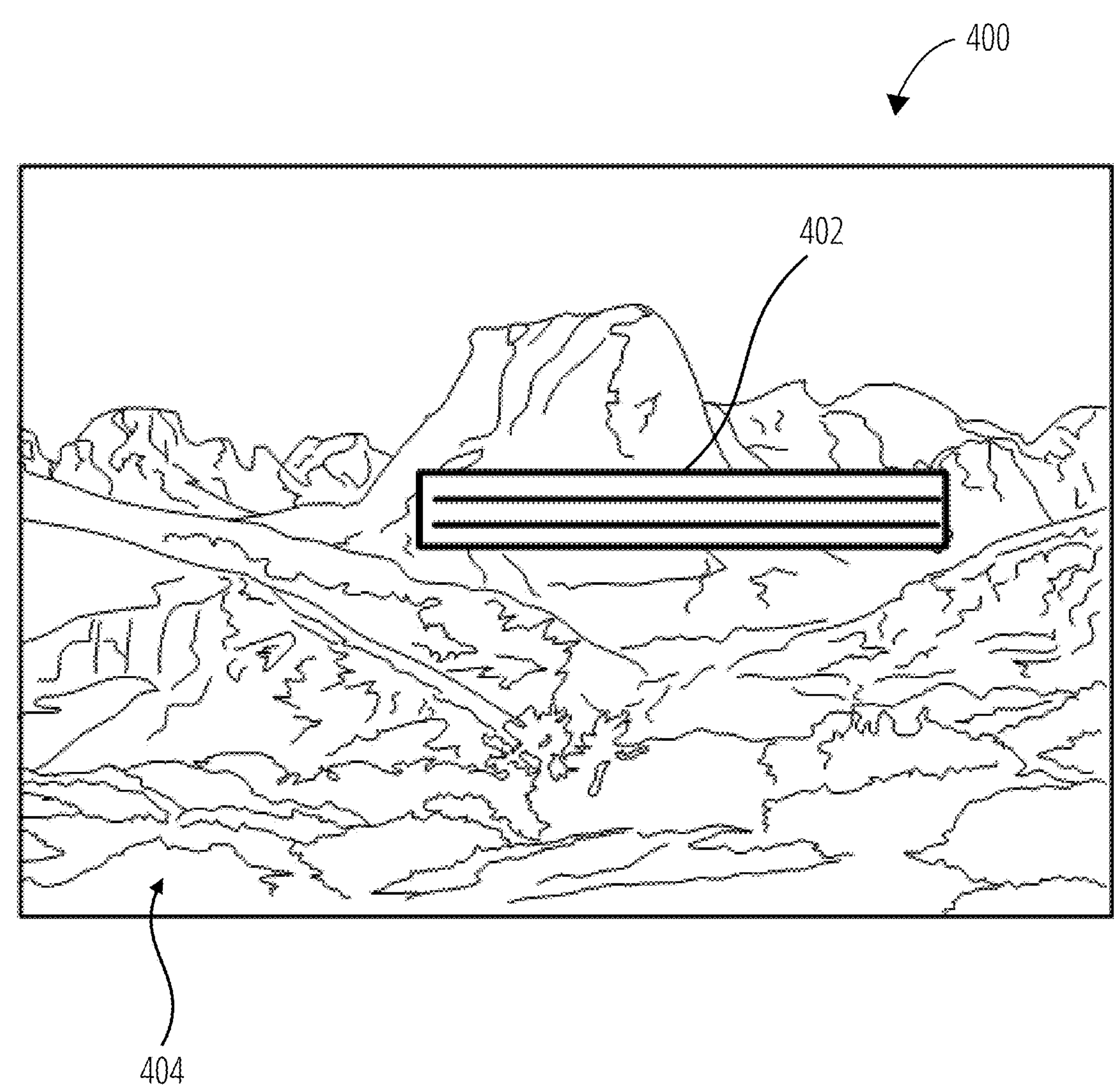
FIG. 4 illustrates an example field of view of a user's eye through the XR display of FIG. 3, showing virtual visual content superimposed on a real-world visual field, in accordance with some examples.

FIG. 4 shows an example field of view 400 of the user's eye 326 through the XR display 300. The field of view 400 includes a real-world visual field 404 (shown as a real-world outdoor landscape) propagated to the user's eye 326 by the environmental light 316, as well as virtual visual content 402 (shown as a rectangular graphical element) superimposed over the real-world visual field 404 due to propagation to the user's eye 326 of the presented light 320. Thus, the light entering the user's eye 326 includes both presented light 320 corresponding to visual content (in this case, virtual visual content 402) presented by the XR display 300, as well as ambient light in the form of the environmental light 316 forming the real-world visual field 404.

Figure 5:
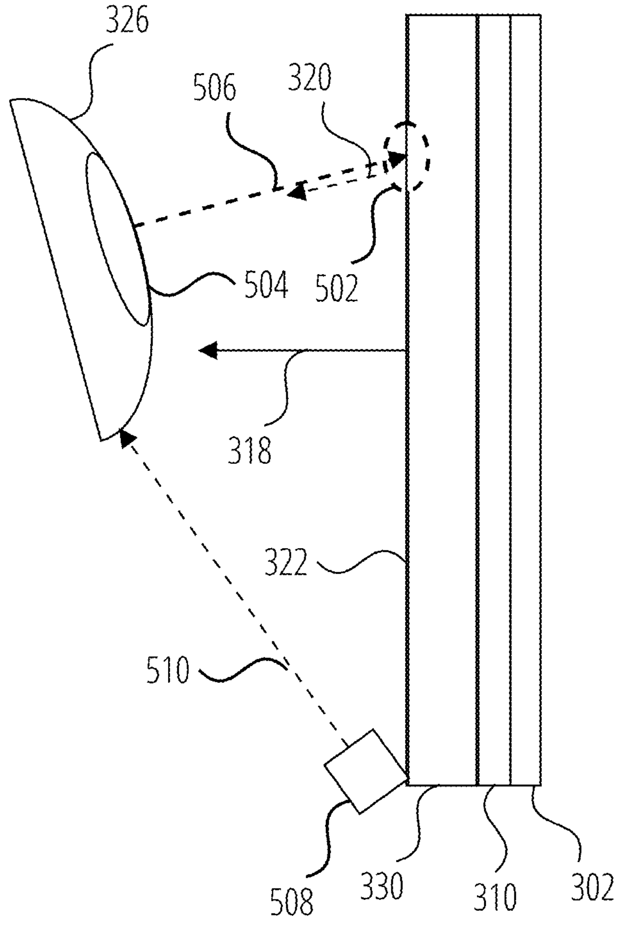
FIG. 5 is a further simplified cross-sectional view of the example XR display of FIG. 3, showing an eye tracking sensor tracking the gaze direction of the eye pointing toward the virtual visual content, in accordance with some examples.

FIG. 5 shows a further simplified cross-sectional view of the XR display 300. In the illustrated example, the XR display 300 includes an eye tracking sensor 508 tracking a gaze direction 506 of the eye 326.

The eye tracking sensor 508 is configured to operate as part of an eye tracking subsystem, as described below, to generate eye tracking data representative of the gaze direction 506 of the eye 326. In some examples, each forward optical assembly (e.g., left forward optical assembly 208 and right forward optical assembly 202) of the glasses 100 includes a respective eye tracking sensor 508 for tracking the gaze direction 506 of the respective eye 326: in some such examples, a depth of gaze fixation may be determined as well as a gaze direction vector for each eye. In some examples, the depth of gaze fixation may be detected based on the vergence angle of the eyes, or the intersection point between the left eye and right eye gaze directions.

In some examples, the eye tracking sensor 508 may include one or more cameras or other optical sensors mounted to the glasses 100 (e.g., to a user-facing side of the left forward optical assembly 208 or right forward optical assembly 202) facing inward toward the user's eye. The eye tracking sensor 508 may be an active sensor that includes one or more light-emissive elements, such as one or more visible or infrared lights for generating glints (e.g., corneal glints) on the user's eye 326 that can be detected by the optical sensor along with other visible landmarks on the eye 326, such as the pupil 504, in order to determine an angle of the gaze direction 506 relative to the angle of reflection of the glint. In some examples, the emissive elements may be arranged as a glint ring or other geometric structure around an area of the user-facing side of the left forward optical assembly 208 or right forward optical assembly 202 to improve detectability of glint positions relative to pupil positions. Examples of commercially available eye tracking systems potentially usable by examples described herein include the Tobii™ Eye Tracker 5 and the eye tracking system used by the Pimax Crystal™ VR headset. In some examples, the eye tracking sensor 508 may use other means of tracking eye movements in order to determine gaze direction; it will be appreciated that various eye tracking techniques are suitable for adaptation to an XR display device. For example, in some cases, the eye tracking data may be collected and provided to the XR display system by an external source configured to track the user's gaze direction. In some examples, one or more other sensors of the XR display system, such as the left camera 114, right camera 116, optical calibration sensor 310, ambient light sensor, and/or environment sensor may share one or more components with the eye tracking sensor 508: for example, a single optical sensor could be used in some cases to detect ambient light, validate the position of the virtual visual content presented by the image presentation component 330, and detect glint positions and pupil positions of the user's eye 326.

In some examples, the eye tracking data is representative of a respective gaze direction 506 of the user's eye 326 over each of a plurality of respective data samples collected at a plurality of points in time within a time window. Gaze velocity may refer to an angular velocity of a change in the gaze direction, and may be measured by sampling the angular displacement between gaze direction vectors at two or more data samples collected at points in time separated by a sampling period, and dividing the change(s) in angle by the sampling period(s) as appropriate.

In the example shown in FIG. 5, the eye 326 is angled such that the gaze direction 506 points toward a first location 502 on the image presentation surface 322 corresponding to the virtual visual content 402, as shown by the presented light 320 issuing from the image presentation surface 322 at first location 502. Thus, in the example shown in FIG. 5, it may be determined by the eye tracking subsystem that the eye 326 is gazing toward the first location 502 on the image presentation surface 322 based on the eye tracking data. In some examples, a similar determination may be made to each of two eyes, such that corresponding gaze targets may be identified with respect to the field of view of each eye. It will be appreciated that, in binocular XR displays, a virtual visual element may be presented at respective locations on the image presentation surface 322 of each optical element 108 and 110 to indicate a single location in three-dimensional space, including an apparent spatial depth of the visual element. Thus, in some examples, the eye tracking data for two eyes may be processed to yield a highly reliable determination of gaze fixation on a fixation target.

Figure 6:
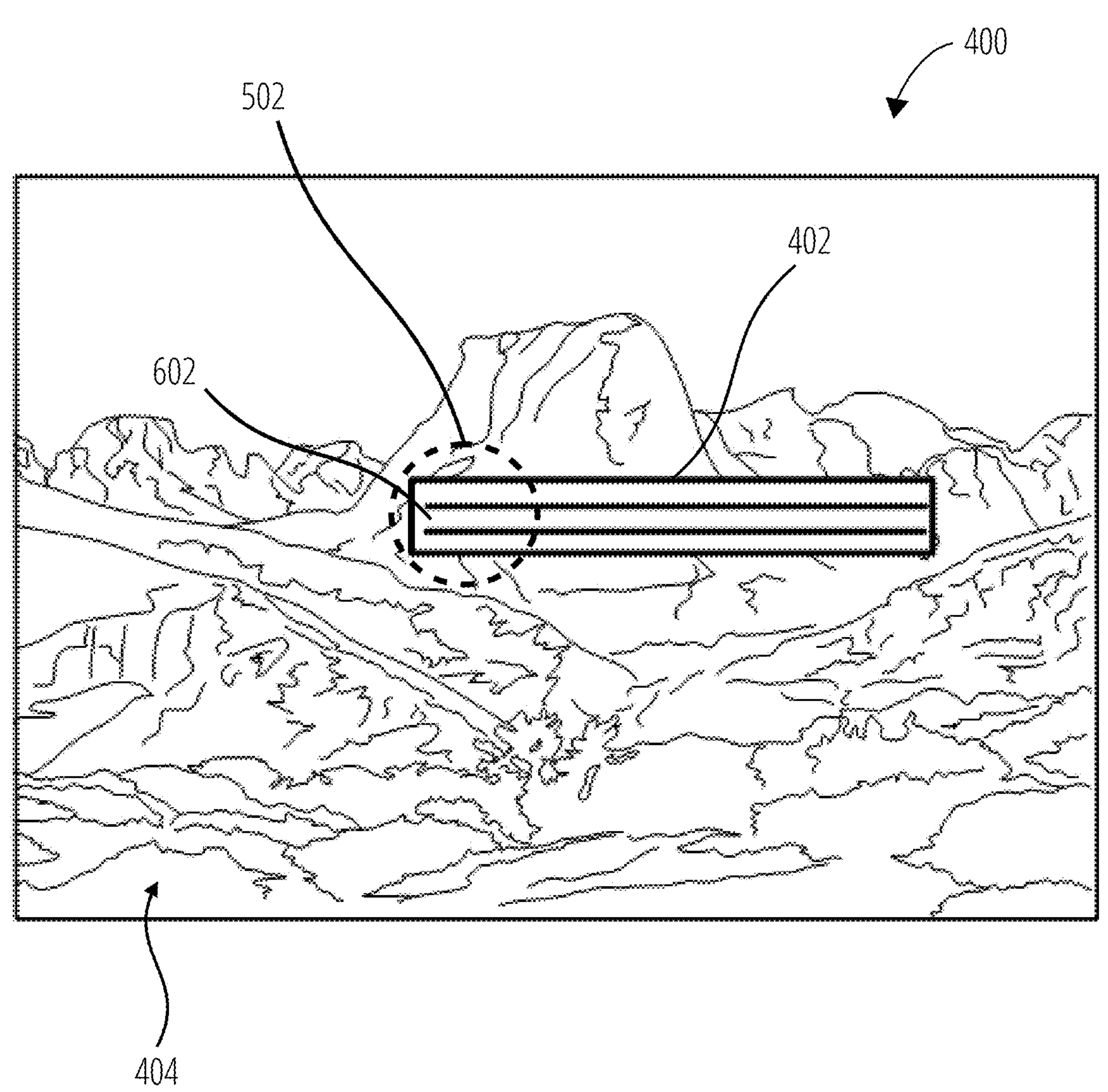
FIG. 6 illustrates a further example of the field of view of FIG. 4, showing gaze fixation on the virtual visual content, in accordance with some examples.

FIG. 6 shows the field of view 400 including the presentation of the virtual visual content 402 and the propagation of the real-world visual field 404 to the eye 326, as in FIG. 4. In this example, the first location 502 (representing the gaze target of the eye 326) is shown to correspond to part of the visual content being presented via the image presentation surface 322 (namely, a portion 602 of the virtual visual content 402) as well as a small portion of the real-world visual field 404 around the virtual visual content 402.

In some examples, the first location 502 is a location on the display device 206 defined by the fixation target as determined by the eye tracking subsystem. The first location 502 may be defined as a portion of the field of view centered on the gaze direction 506, such as a three degree window of the field of view located within the visual field based on the vergence depth of the user's eyes.

Figure 7:
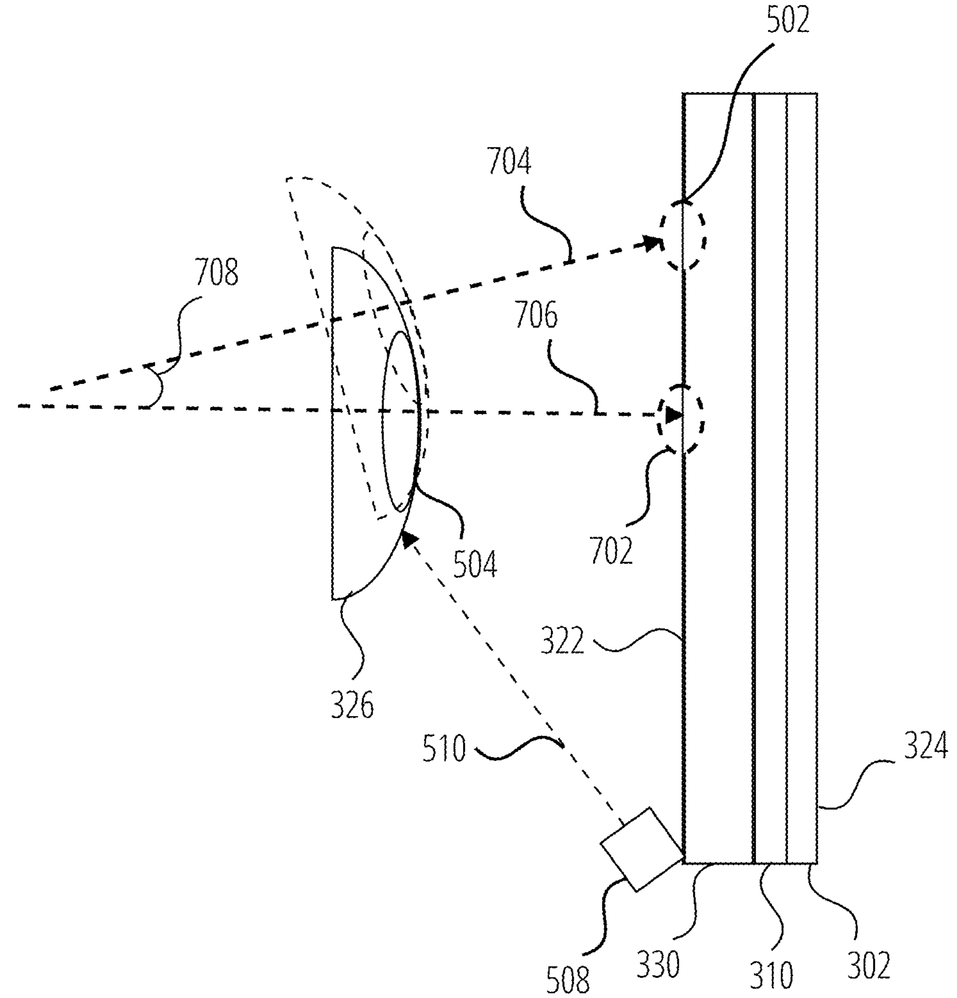
FIG. 7 is a further simplified cross-sectional view of the example XR display of FIG. 3, showing the eye tracking sensor tracking the gaze direction during a rapid eye movement, in accordance with some examples.

FIG. 7 shows a further simplified cross-sectional view of the XR display 300. As in FIG. 5, the eye tracking sensor 508 is used to track the gaze direction of the user's eye 326.

In the example shown in FIG. 7, the eye 326 rotates between two positions over time. The eye 326 begins angled such that the first gaze direction 704 points toward a first location 502 on the image presentation surface 322 of the image presentation component 330. The eye 326 then rotates to a different angle to point in the second gaze direction 706 toward a second location 702 on the image presentation surface 322 of the image presentation component 330. An angle 708 is defined between the first gaze direction 704 and second gaze direction 706, shown here in two dimensions, but in reality defined in three dimensions. If the trajectory of the movement of the eye 326, as detected by the eye tracking subsystem using the eye tracking sensor 508, satisfies certain criteria, it may be considered a rapid eye movement (e.g., a saccade), and the XR display system may respond by modifying the display configuration accordingly to reduce color breakup and/or other motion artifacts, as described below.

Figure 8:
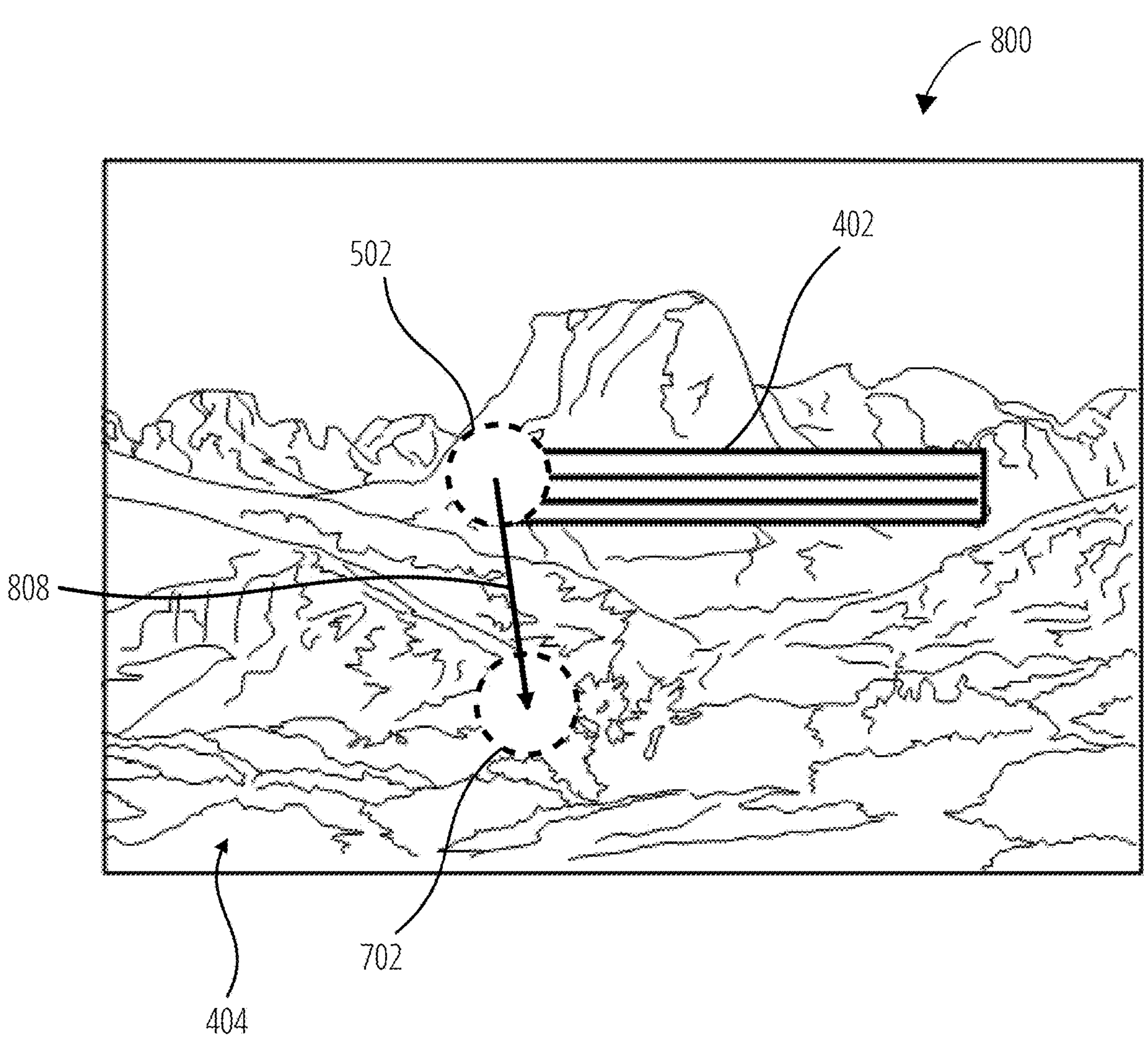
FIG. 8 illustrates a further example of the field of view of FIG. 4, showing the starting and ending locations of a rapid eye movement, in accordance with some examples.

FIG. 8 shows a further example field of view 800 in corresponding to the eye movement shown in FIG. 7. The eye 326 begins gazing toward the first location 502, but over time rotates to gaze toward the second location 702. This eye movement 808 can be detected by the eye tracking subsystem, and the XR display system can modify the display configuration during this movement according to techniques described herein.

Figure 13:
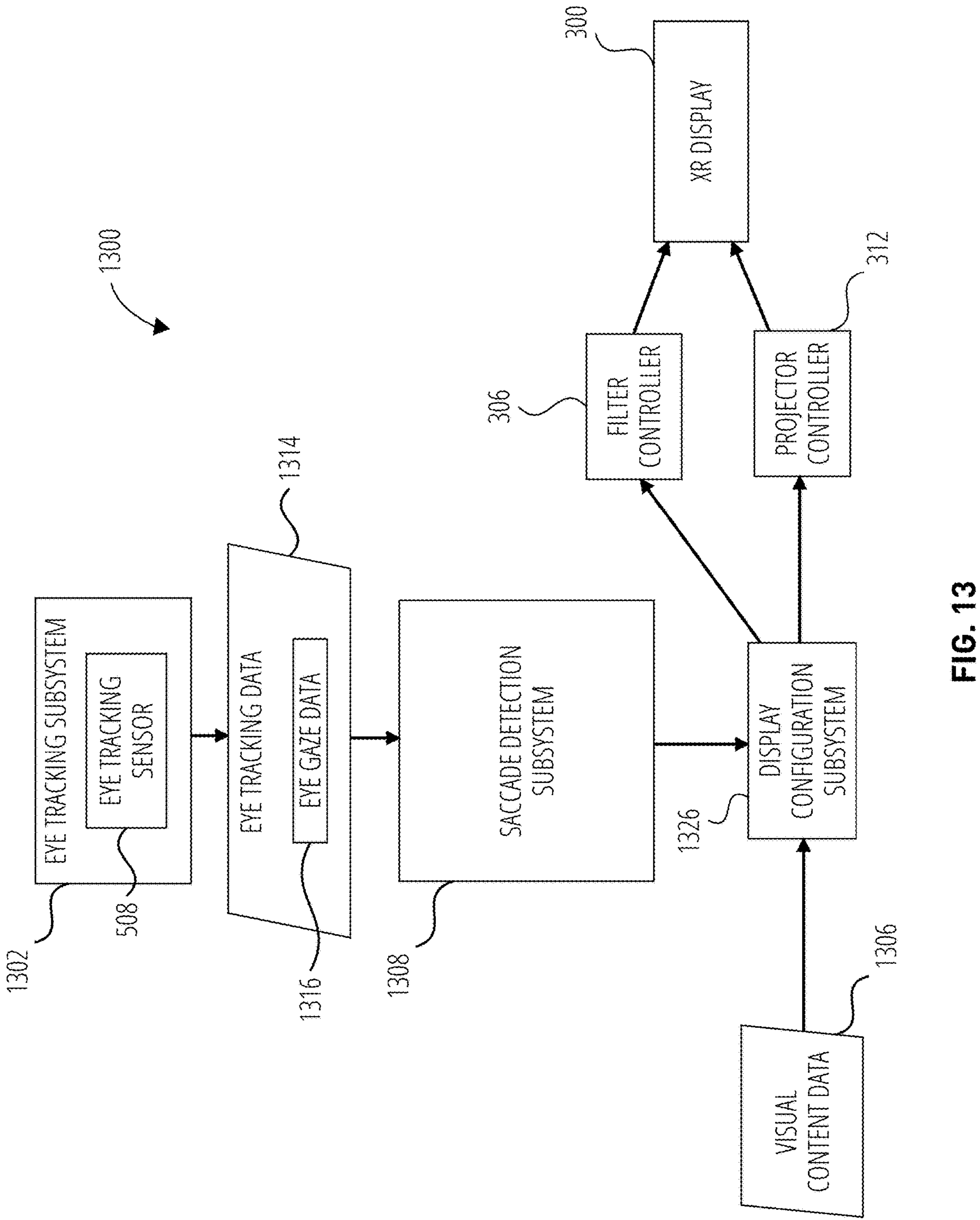
FIG. 13 is a block diagram of components of an XR display system configured to perform techniques described herein, in accordance with some examples.
Figure 14:
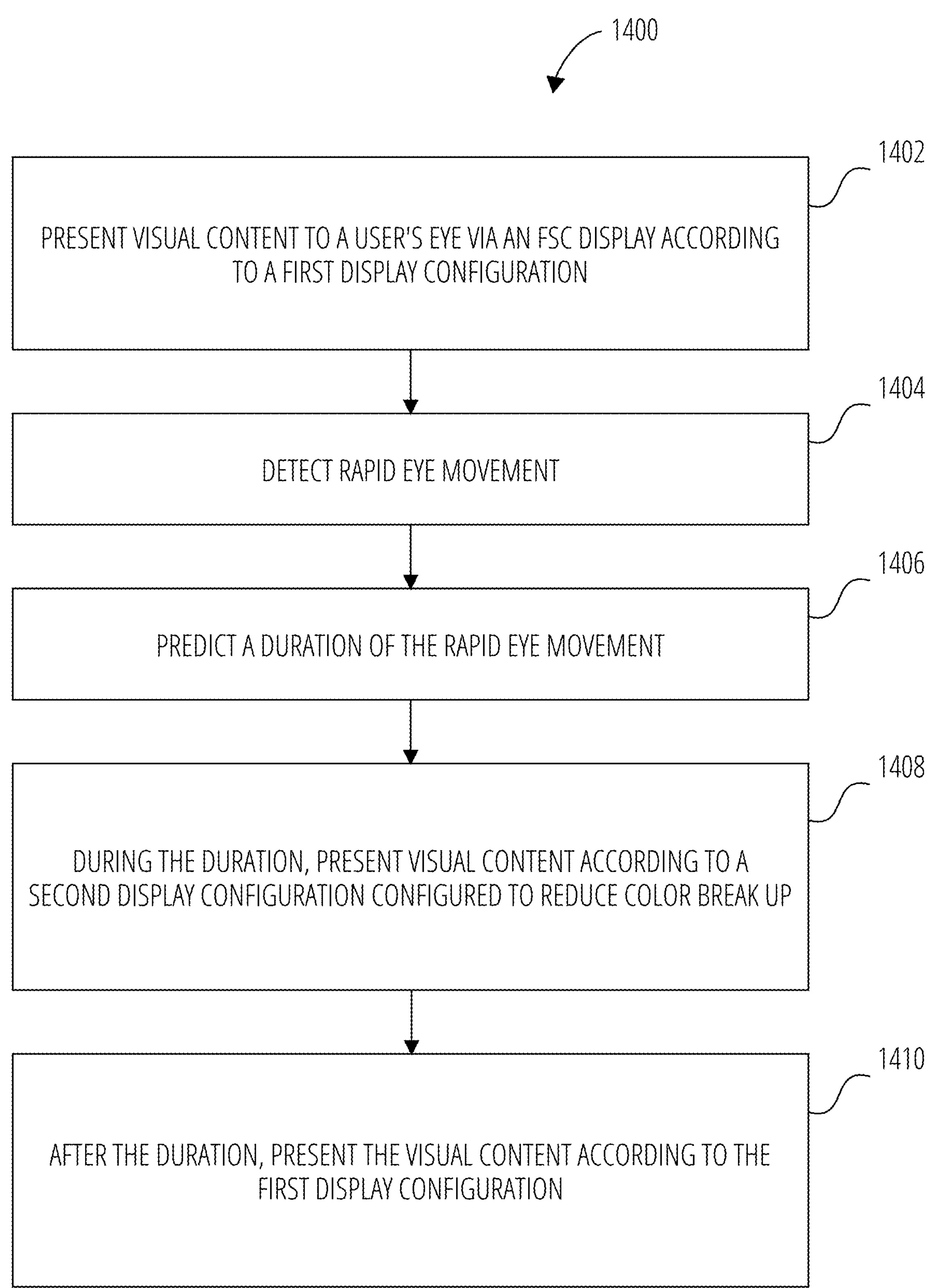
FIG. 14 illustrates a method for reducing color breakup of an FSC display during rapid eye movement, in accordance with some examples.
Figure 15:
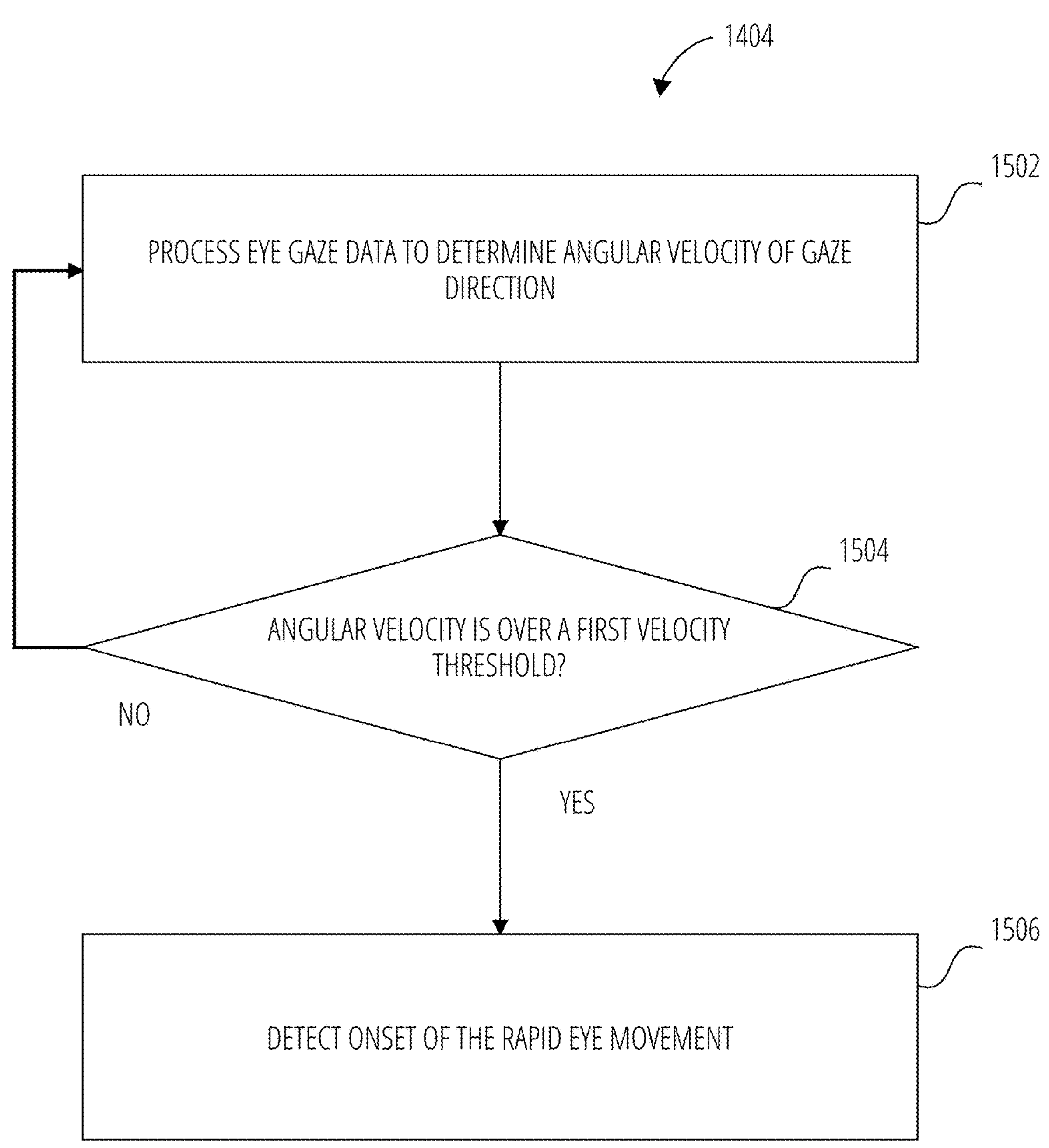
FIG. 15 illustrates operations of the step of detecting rapid eye movement of the method of FIG. 14, in accordance with some examples.
Figure 16:
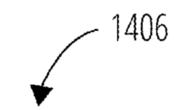
FIG. 16 illustrates operations of the step of predicting a duration the rapid eye movement of the method of FIG. 14, in accordance with some examples.
Figure 16:
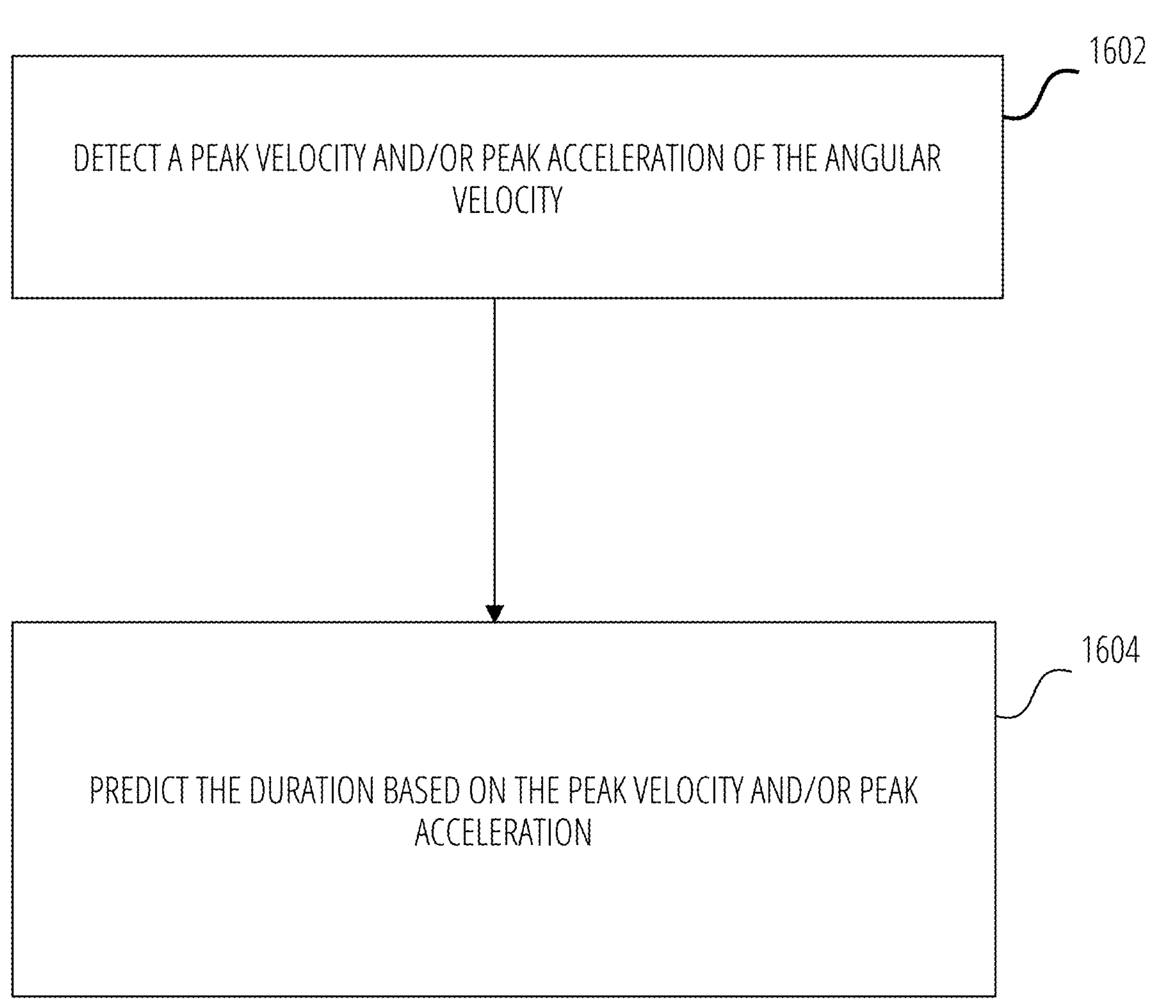
Figure 17:
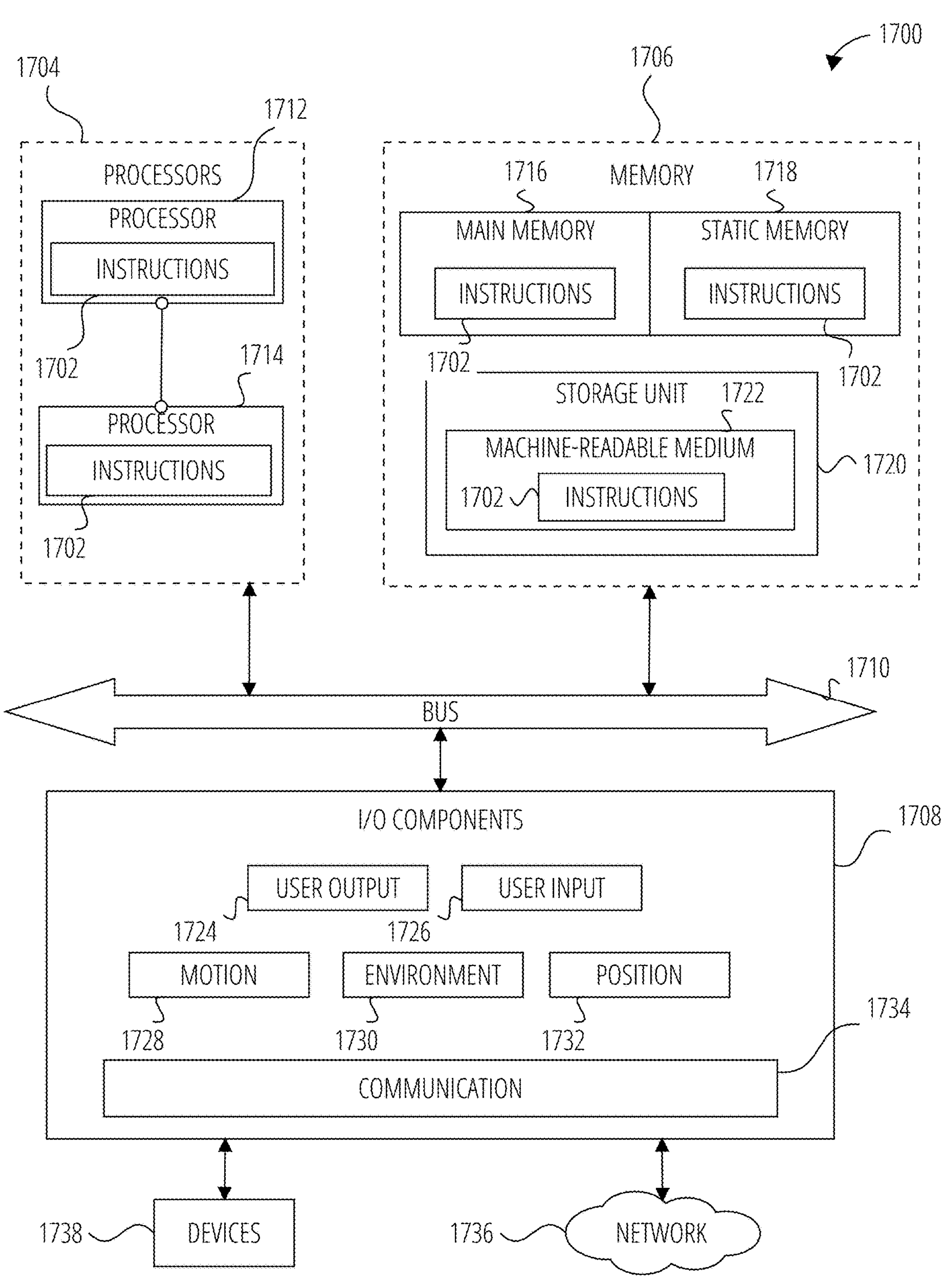
FIG. 17 is a diagrammatic representation of a machine in the form of a computer system within which a set of instructions may be executed to cause the machine to perform any one or more of the methodologies discussed herein, in accordance with some examples.
Figure 18:
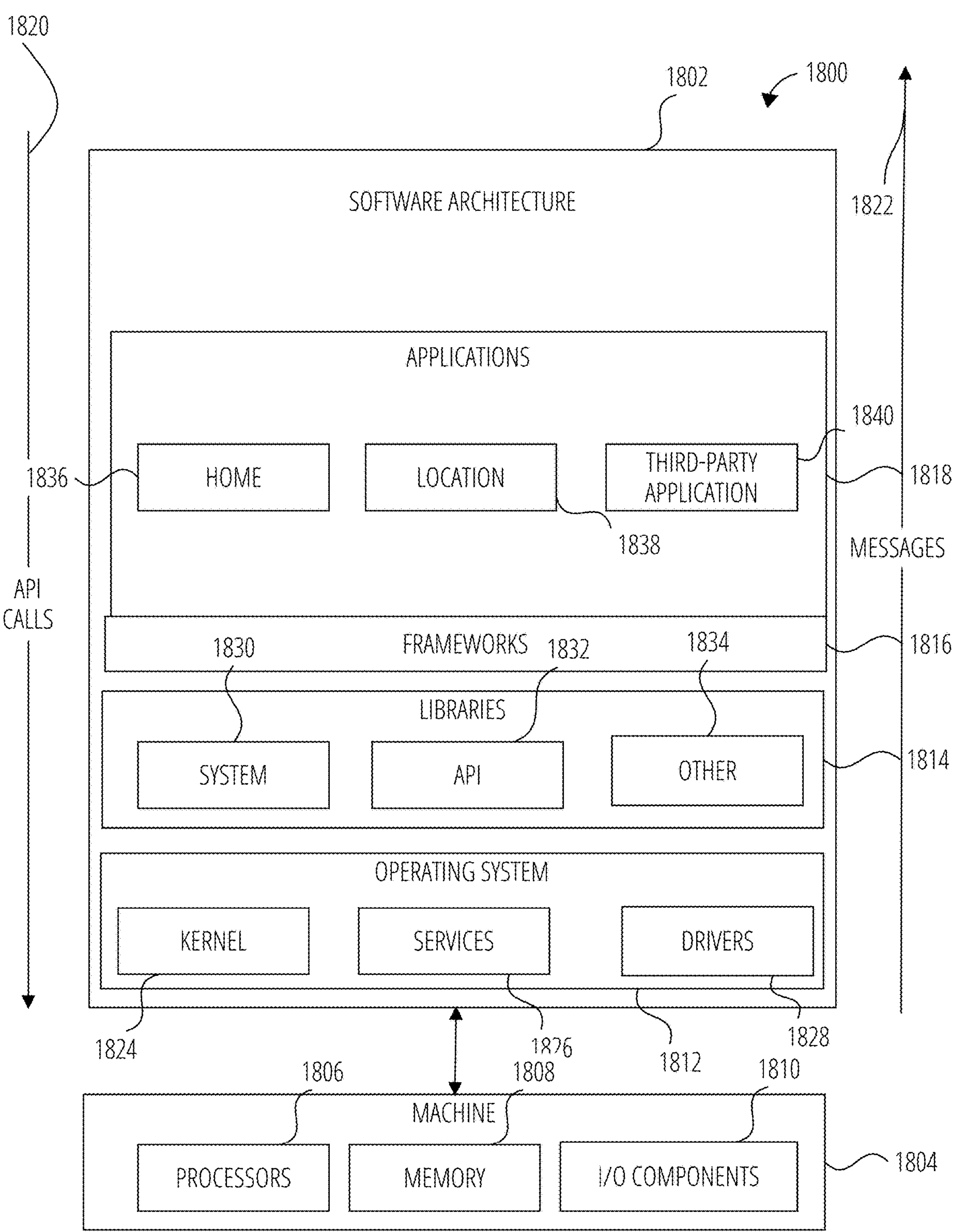
FIG. 18 is a block diagram showing a software architecture within which examples may be implemented.

Techniques for detecting saccades and predicting their duration are discussed below with reference to FIG. 9A through FIG. 10B. Techniques for modifying the display configuration to reduce color breakup and/or other motion artifacts during rapid eye movement are described below with reference to FIG. 11 through FIG. 12B. FIG. 13 shows a block diagram of an example XR display system for performing the techniques and methods described herein, and FIG. 14 through FIG. 16 shows flowcharts for examples of such methods. FIG. 17 and FIG. 18 illustrate example machine and software architectures suitable for implementing the systems and methods described herein.

Figure 9A:
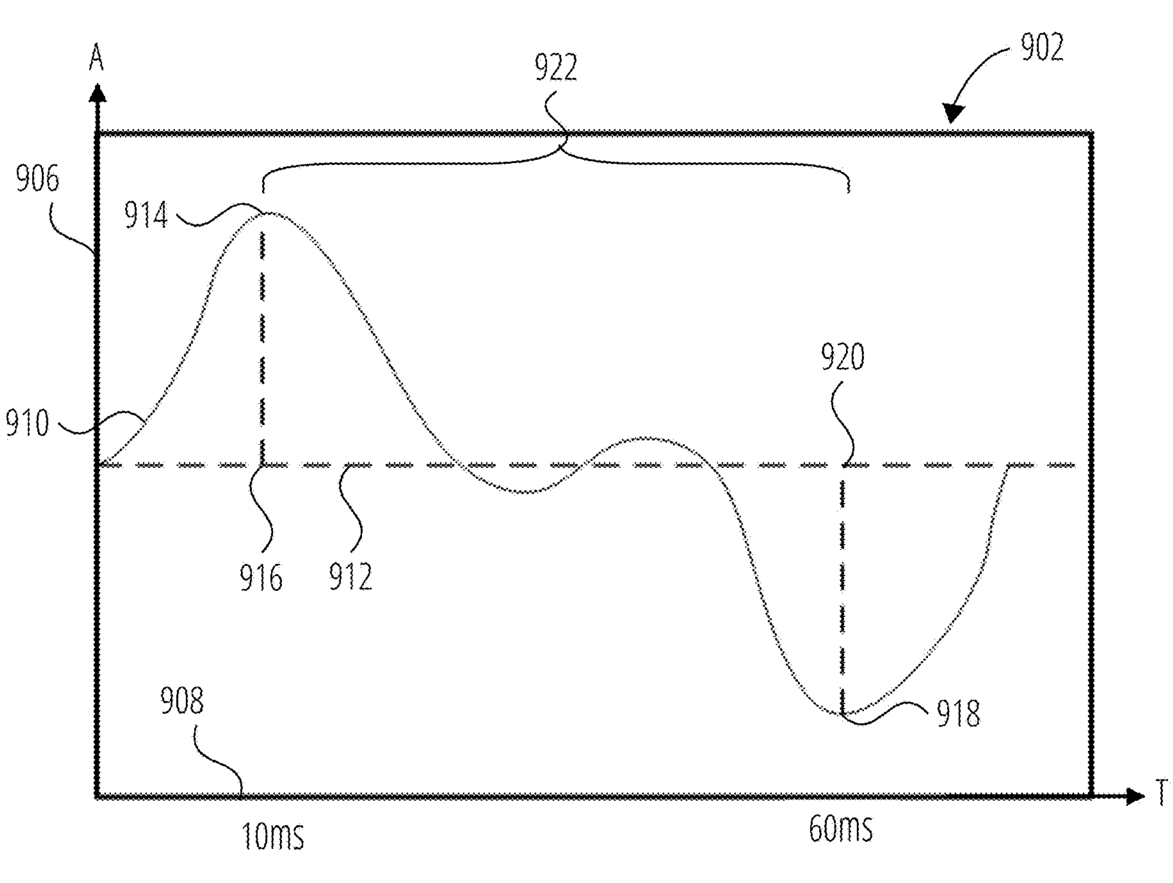
FIG. 9A illustrates an acceleration profile graph showing characteristics of a large rapid eye movement or saccade over time from start to finish, in accordance with some examples.
Figure 9B:
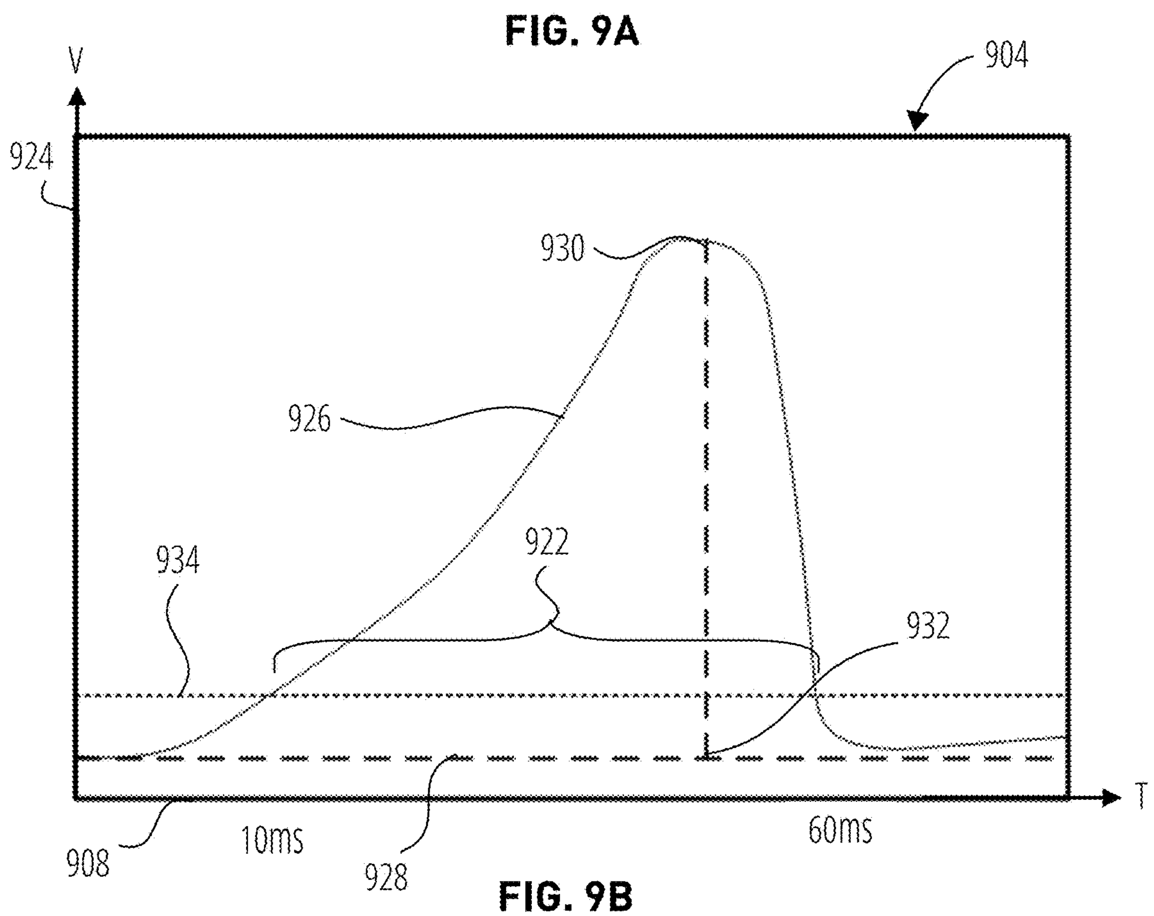
FIG. 9B illustrates a velocity profile graph corresponding to the acceleration profile graph of FIG. 9A, in accordance with some examples.

FIG. 9A illustrates an acceleration profile graph 902 showing characteristics of a rapid eye movement (such as eye movement 808) over time, while FIG. 9B illustrates a corresponding velocity profile graph 904. These graphs (902, 904) illustrate profiles of a relatively large saccade, spanning approximately 20 degrees of the field of view of the eye.

References herein to acceleration and velocity will be understood to refer to angular acceleration, such as degrees per second squared, and angular velocity, such as degrees per second, unless otherwise indicated.

The acceleration graph 902 plots an eye movement 910, showing acceleration 906 over time 908. The plot of the eye movement 910 begins near a zero acceleration 912 line, indicating a relatively stationary eye position prior to the saccade. The eye movement 910 then accelerates steeply to a peak acceleration 914 at a peak acceleration time 916 of approximately 10 milliseconds (ms) from the beginning of the graph 902. The eye movement 910 then falls back to oscillate near the zero acceleration 912 line before decelerating to a peak deceleration 918 at a peak acceleration time 916 at approximately 60 ms. The eye movement 910 then returns to the zero acceleration 912 line, becoming stationary again after the end of the saccade.

The velocity graph 904 plots a velocity curve of the eye movement 926 as velocity 924 over time 908, relative to a zero velocity 928 line. The velocity 924 of the eye movement 926 rises steeply to a peak velocity 930 at a peak velocity time 932, then falls in velocity 924 back to the zero velocity 928 line, indicating the end of the saccade.

In some examples, the eye tracking data gathered by the eye tracking sensor can be used to determine the early portions of the acceleration 906 and/or velocity 924 profiles of the eye movement in real time during the saccade. These early portions of the profiles can be used to detect the onset of a saccade and to predict its duration, thereby enabling the system to modify the display characteristics to reduce color break up and/or other motion artifacts during the saccade.

For example, the onset or beginning of a saccade or other rapid eye movement can be detected based on the angular velocity 924 rising above a velocity threshold 934. Detection of a saccade onset can trigger an operation to predict the saccade duration and to modify the display characteristics during the saccade duration. In some examples, the velocity threshold 934 may be set to a velocity 924 value between 30 and 50 degrees per second.

In some examples, the system can employ different, or multiple, approaches to detecting saccade onset. The velocity-based detection described above can be augmented in some examples by analyzing acceleration profiles, such as graph 904. In some examples, machine learning or non-linear modeling approaches may also be implemented to detect onset patterns in the eye tracking data. Larger saccades exceeding 10 degrees, such as the 20-degree eye movement plotted in graph 902 and graph 904, tend to exhibit more noticeable color breakup and/or other motion artifacts. In these cases, the system may employ more sophisticated detection methods that analyze both velocity and acceleration characteristics.

In some examples, the saccade detection process can operate at high temporal resolution, with each eye tracking sample being aggregated with previous samples to determine when saccadic movement begins. The system can be configured to ignore smaller saccades (e.g., under 1 degree) where color breakup and/or other motion artifacts are less problematic, which can help to manage computational resources and system latency.

In response to detecting the saccade onset, the system predicts a duration 922 of the saccade. In some examples, the system employs one or more approaches to predicting saccade duration based on characteristics shown in the velocity profile graph 904 and/or acceleration profile graph 902. A first example approach analyzes the peak velocity 930 shown in graph 904 to estimate the total saccade duration 922. After detecting saccade onset (e.g., when eye gaze velocity 924 exceeds the velocity threshold 934), the system monitors the velocity curve of the eye movement 926 on a sample-by-sample basis. When the current velocity sample is lower than the previous sample, the peak velocity 930 has been reached, thereby providing both the peak velocity 930 value and the peak velocity time 932, and allowing the system to predict the remaining duration 922 using established main sequence relationships between peak velocity and total saccade duration. The saccade main sequence is an empirically determined relationship that describes the linear relationship between saccade peak velocity 930 and saccade duration 922, and which allows the system to estimate total movement time after detecting the maximum eye movement speed.

In some examples, the duration 922 can be predicted based on a definition of saccade offset or ending that corresponds to a predicted time at which the velocity 924 of the eye movement 926 will fall below the velocity threshold 934. In other examples, a first velocity threshold is used to detect the saccade onset, and a different second velocity threshold is used to define the saccade offset for the purpose of predicting duration 922. In some examples, the latency of the system may be short enough that prospective prediction of the duration 922 is not necessary, and the duration 922 can be determined in real time when the velocity 924 falls below the velocity threshold 934. However, for systems in which latency is a significant factor constraining the ability to detect saccades and respond by switching the display characteristics back and forth between two configurations in real time, prospective prediction of saccade duration 922 allows the system enough time to modify display operation during the saccade and to return to normal operation by the time or after the saccade finishes.

A second example approach to predicting saccade duration 922 utilizes the acceleration profile shown in graph 902. The system detects the peak acceleration 914 occurring at peak acceleration time 916. Saccadic eye movements (such as eye movement 910) exhibit a characteristic pattern in which the peak deceleration 918 at peak deceleration time 920 has approximately the same magnitude as the peak acceleration 914. By detecting the peak acceleration 914 at peak acceleration time 916, the system can predict when peak deceleration will occur and estimate the total duration 922 accordingly. In some examples, the duration 922 can be defined as the period between the peak acceleration time 916 and peak deceleration time 920. In other examples, the duration 922 can be defined as the period between the velocity 924 rising above the velocity threshold 934 and the acceleration 906 reaching peak deceleration 918 at the peak deceleration time 920. Other definitions of saccade duration 922 can be used in other examples.

Various combinations of velocity and acceleration-based prediction methods can thereby enable the system to overcome display latency constraints by anticipating when to terminate the modification to the display and return to baseline display operation.

As used by examples herein, the definition of the saccade duration 922 can be set to capture those temporal portions of the saccade that are particularly likely to give rise to color break up. For example, if it is determined that color break up is most likely to be perceived starting 2 ms before the peak acceleration time 916 and ending 3 ms after the peak deceleration time 920, the duration 922 can be defined to span that time period. The duration 922 can therefore be defined based on some suitable combination of acceleration 906 and/or velocity 924, with or without modification based on thresholds, delays, or other predetermined values. In some examples, the duration 922 is determined using non-deterministic techniques, such as by the use of a model trained using machine learning techniques to predict saccade duration 922 (and therefore a time period in which color break up is likely to be perceived) based on eye tracking data. In some examples, the duration 922 is defined not only to reduce color break up, but also to reduce the perceptibility of the display modifications described below.

In the illustrated examples of FIG. 9A and FIG. 9B, the duration 922 spans approximately 50 milliseconds (10 ms to 60 ms), which is characteristic of large amplitude saccades that exhibit more noticeable color breakup and/or other motion artifacts. Smaller amplitude saccades are typically shorter in duration, as described below with reference to FIG. 10A and FIG. 10B.

After detecting saccade onset, the system modifies the configuration of the display to reduce color break up and/or other motion artifacts, and this modification is reverted to the initial configuration at the predicted end of the duration 922. Examples of display configuration modification are described below with reference to FIG. 11 through FIG. 12B.

Figures 10A, 10B:
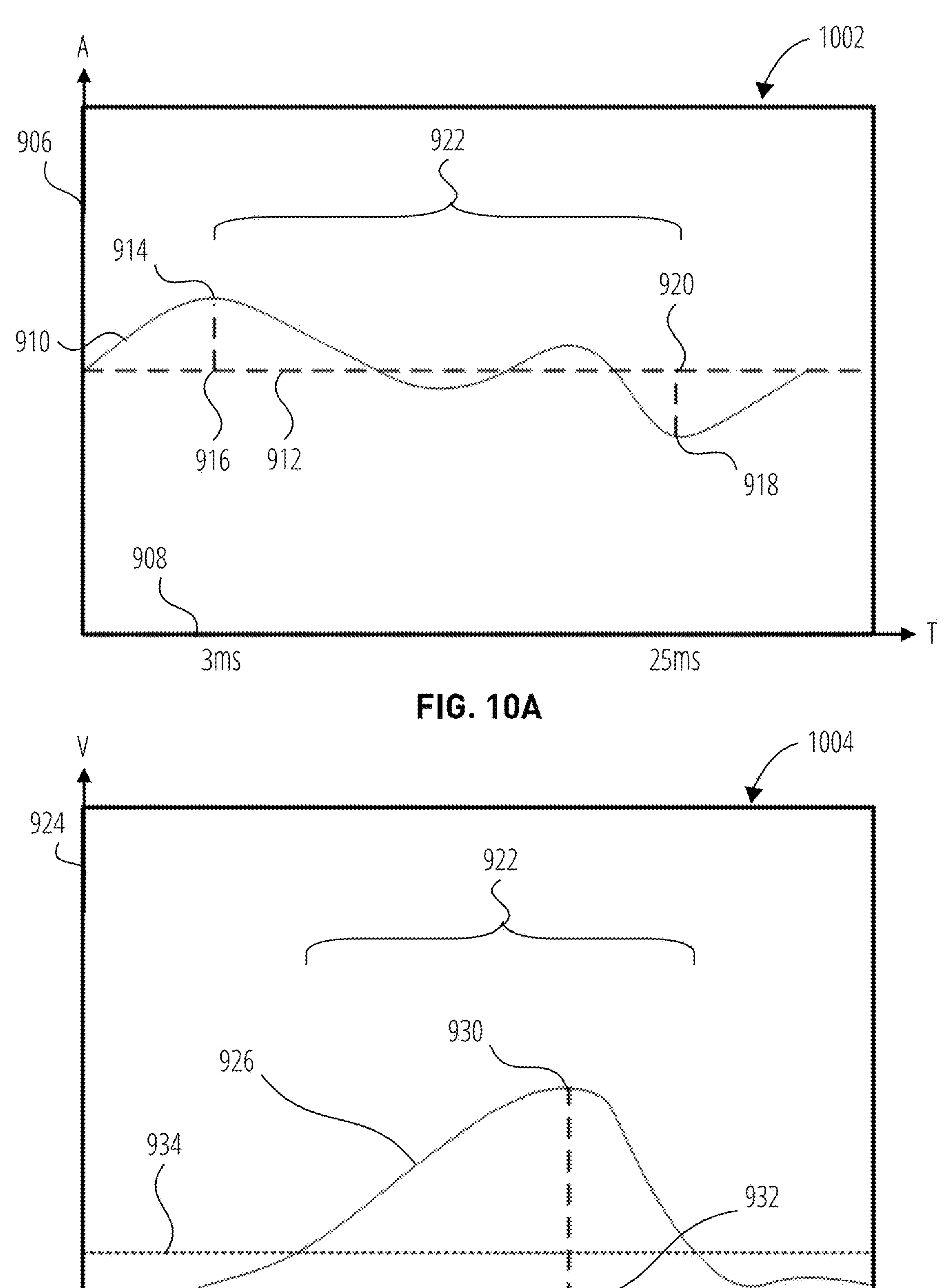
FIG. 10A illustrates an acceleration profile graph showing characteristics of a small rapid eye movement or saccade over time from start to finish, in accordance with some examples.
FIG. 10B illustrates a velocity profile graph corresponding to the acceleration profile graph of FIG. 10A, in accordance with some examples.

FIG. 10A and FIG. 10B illustrate acceleration and velocity profiles for a smaller amplitude saccade, such as a 3 degree saccade, in contrast to the 20-degree saccade shown in FIG. 9A and FIG. 9B. The key differences are in the temporal and magnitude characteristics of the eye movement.

The acceleration graph 1002 in FIG. 10A shows the same components as FIG. 9A, but with a compressed time scale such that the duration 922 spans from 3 ms to 25 ms in time 908, compared to the 10 ms to 60 ms span in FIG. 9A. The eye movement 910 in graph 1002 exhibits a similar pattern of acceleration 906 as in FIG. 9A, rising to peak acceleration 914 at peak acceleration time 916, followed by oscillation near the zero acceleration 912 line and a peak deceleration 918 at peak deceleration time 920. However, the total duration 922 is approximately 22 milliseconds, less than half the duration of the larger saccade of FIG. 9A. Furthermore, the peak acceleration 914 and peak deceleration 918 in FIG. 10A are much lower in magnitude than their counterparts in FIG. 9A.

Similarly, the velocity graph 1004 in FIG. 10B shows the velocity 924 of eye movement 926 rising above the velocity threshold 934 to reach peak velocity 930 at peak velocity time 932. The peak velocity 930 is notably lower than in FIG. 9B, consistent with the main sequence relationship between saccade amplitude and peak velocity. The duration 922 in FIG. 10B spans from 5 ms to 27 ms in time 908, roughly matching the compressed timeframe shown in the acceleration profile of FIG. 10A. The shorter duration and lower peak velocity are characteristic of smaller amplitude saccades, which typically exhibit less noticeable color breakup and/or other motion artifacts and may not require display parameter adjustments during the saccade movement.

As noted above, various examples can use various techniques to modify display parameters during detected saccades to reduce color break up and/or other motion artifacts. These techniques can be used alone or in combination in different examples. One or more parameters of the display, such as brightness, contrast, opacity, and/or color mixing, can be modified from a first display configuration to provide a second display configuration during the saccade duration 922. The second display configuration is configured to reduce the perceptibility of color break up during the saccade. In some examples, the modification of the display configuration is performed by modifying control signals used to drive the display.

In a first approach to display modification, the system reduces the opacity of visual content by controlling the optical filter 302 interposed between the virtual visual content 402 and the real-world visual field 404. The opacity of the optical filter 302 of FIG. 3 can be dynamically adjusted to allow more environmental light 316 transmission during saccades. An example of this first approach is illustrated in FIG. 11.

Figure 11:
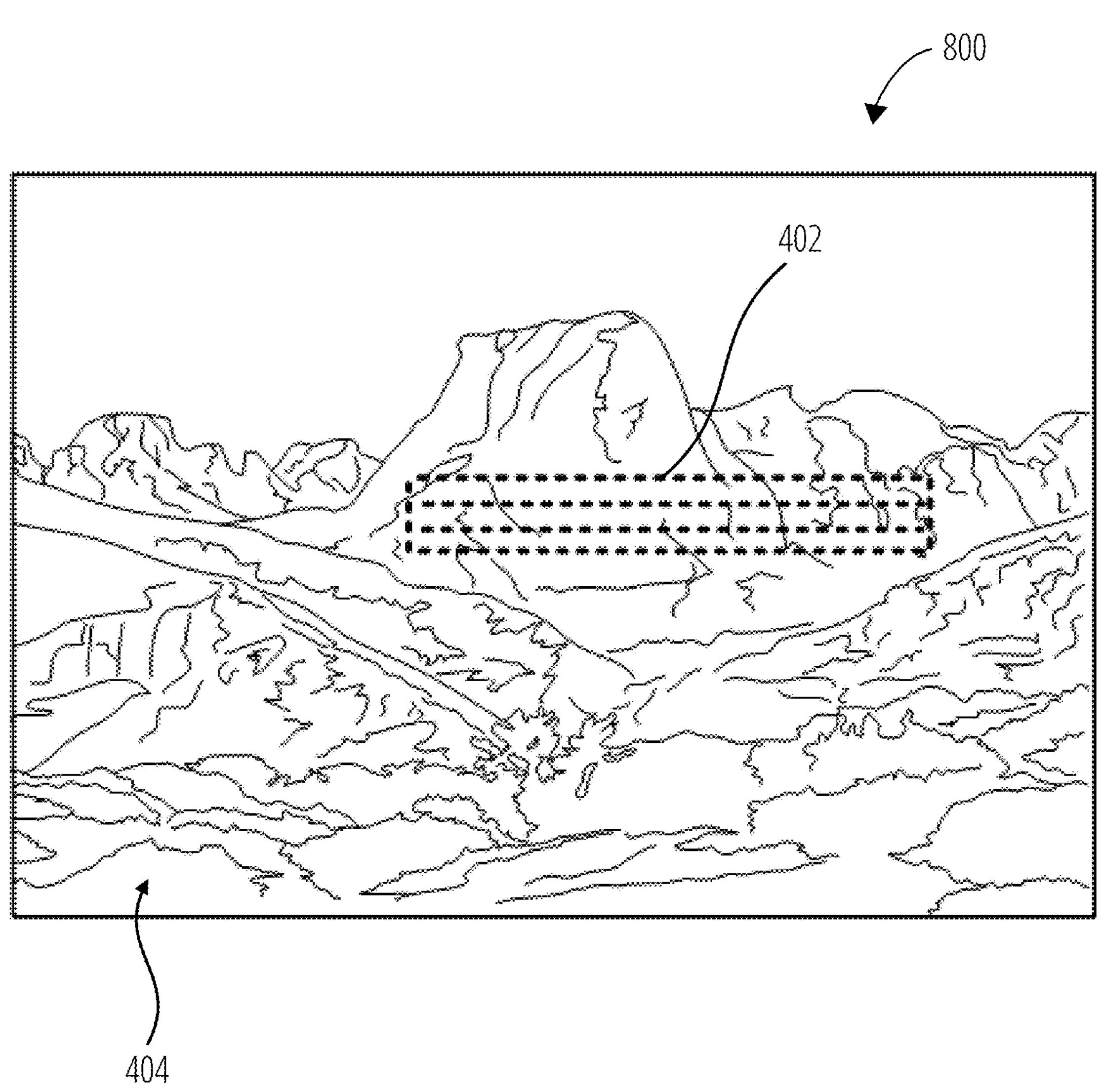
FIG. 11 illustrates a further example of the field of view of FIG. 4, showing the virtual visual content presented at a reduced opacity, in accordance with some examples.

FIG. 11 illustrates a field of view 800 showing the virtual visual content 402 presented at a reduced opacity during a detected rapid eye movement.

The field of view 800 includes a real-world visual field 404 visible through the transparent FSC display device. The virtual visual content 402 appears as a rectangular element superimposed on the real-world visual field 404, but is shown with a dotted or dashed outline to indicate its reduced opacity state during the saccadic eye movement.

The reduced opacity configuration represents the second display configuration implemented by the system during detected rapid eye movements to reduce color breakup and/or other motion artifacts. This modification may be accomplished through multiple mechanisms, including reducing the optical filter opacity to allow more environmental light transmission, decreasing projector LED power, and/or modifying the RGB values of the rendered content to reduce contrast of the projected visual content.

The opacity reduction is applied uniformly across the virtual visual content 402 during the predicted saccade duration. The system maintains this reduced opacity state throughout the predicted duration of the rapid eye movement before returning to the first display configuration with normal opacity levels.

In a second approach, the system may reduce the brightness of the virtual visual content 402 by decreasing the emitter power of the projector 328, and/or reduce the contrast of the rendered content by modifying RGB values. Studies have shown that users are highly insensitive to such luminance and contrast changes during saccades, making these approaches effective while remaining imperceptible.

A third approach modifies the color composition of virtual content, particularly at boundaries between differently colored regions. The FSC display presents visual content as a temporal sequence of monochromatic color images. The system identifies regions and their boundaries based on color data, determines the nearest primary color in a color space (such as pure red, green or blue) for border portions, and modifies those border portions to use only the nearest monochromatic color. This reduces color breakup by eliminating the sequential presentation of multiple colors at region boundaries where the artifacts are most noticeable. The border regions, and the boundaries between the different color regions, can be identified as high-frequency regions of color change with respect to the various color values of the pixels. In some examples, the monochromatic border portions may be combined with opacity, brightness, and/or contrast reduction in middle and low spatial frequencies to maintain object recognition while minimizing artifacts. An example of the third approach is illustrated in FIG. 12A and FIG. 12B.

Figure 12A:
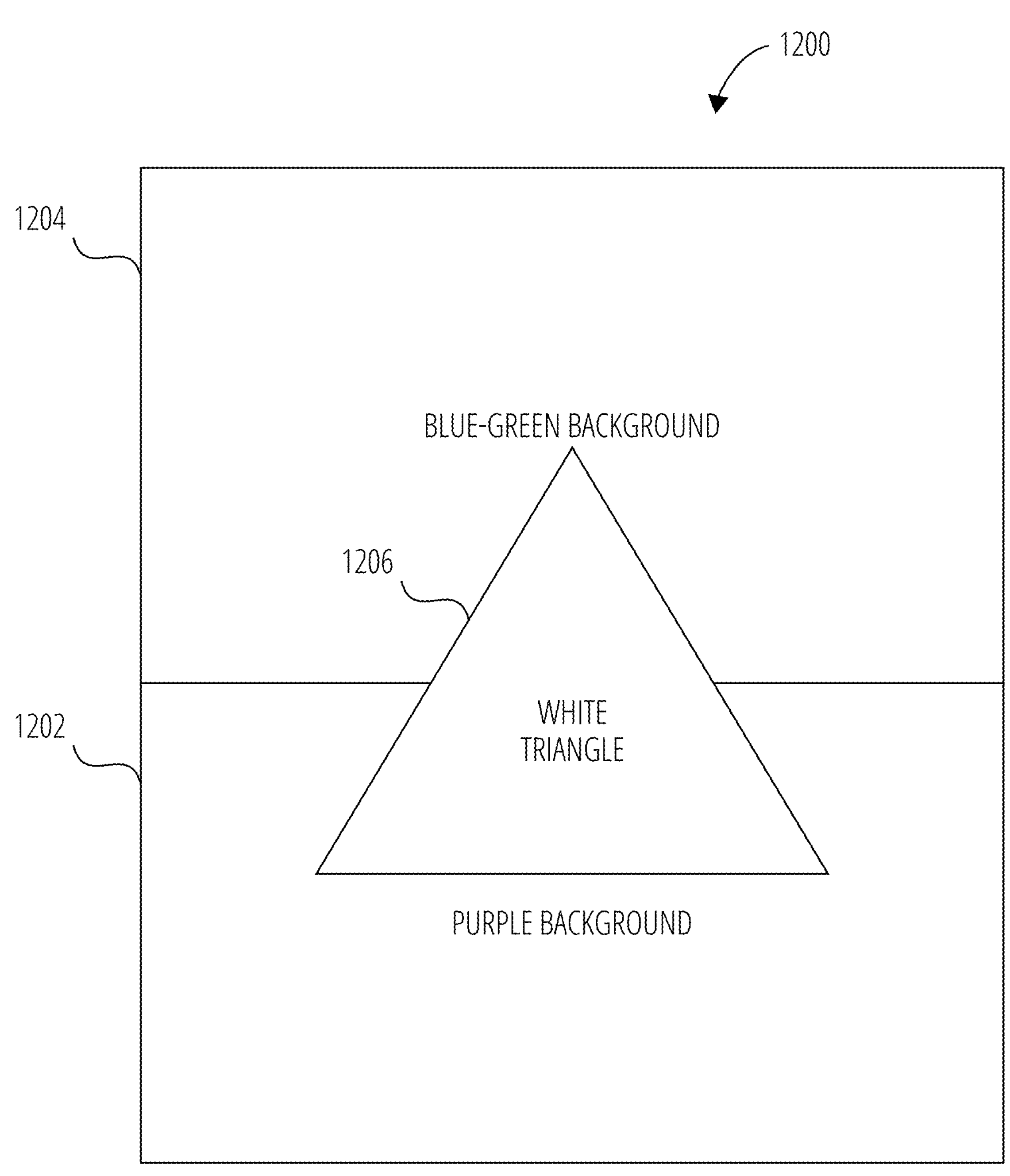
FIG. 12A illustrates a first display configuration image presented by a field sequential color display device according to a first display configuration, in accordance with some examples.
Figure 12B:
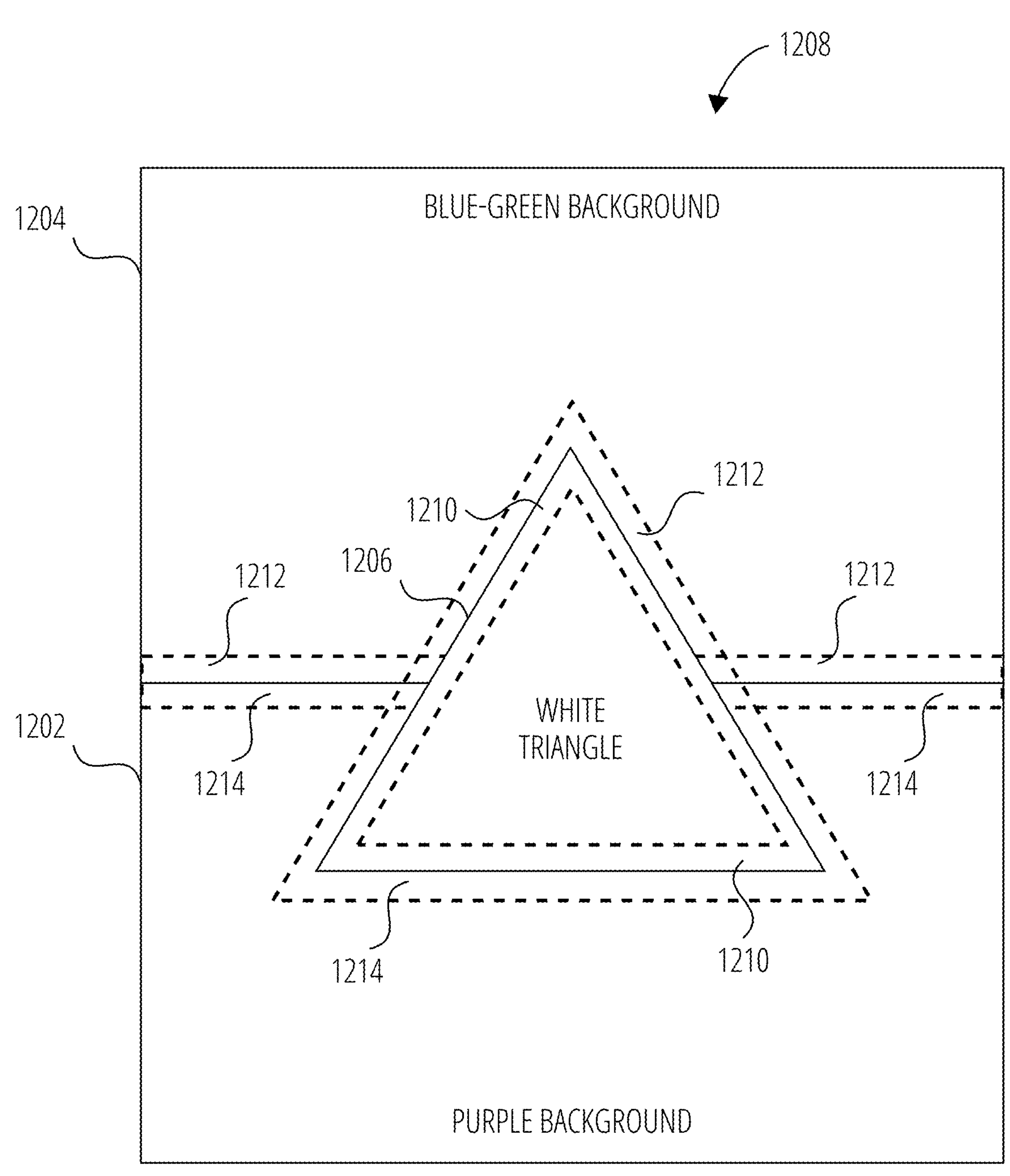
FIG. 12B illustrates a second display configuration image presented by a field sequential color display device according to a second display configuration, in accordance with some examples.

FIG. 12A shows a first display configuration image 1200 presented by the FSC display device according to a first display configuration. The first display configuration image 1200 consists of several differently colored regions: a purple background 1202 region, a blue-green background 1204 region, and a white triangle 1206 region. These shapes are used as a simplified example: the techniques described herein can be used to modify the presentation of more complex images, such as video frames showing real-world scenes captured by cameras, or any other type of visual content.

The white triangle 1206 is positioned between the purple background 1202 and blue-green background 1204, creating boundaries between regions of different colors.

In this example, the white triangle 1206 has uniform pixel RGB values of (255, 255, 255), representing pure white. The blue-green background 1204 has uniform pixel RGB values of (0, 200, 200), creating a cyan or turquoise color. The purple background 1202 has uniform pixel RGB values of approximately (150, 0, 130), mixing red and blue components.

FIG. 12B shows a second display configuration image 1208 displayed according to a second display configuration that modifies the visual content of the first display configuration image 1200 to reduce color breakup artifacts during rapid eye movements. The second display configuration image 1208 maintains the same regions as the first configuration—the purple background 1202, blue-green background 1204, and white triangle 1206—but modifies the colors of the visual content displayed at region boundaries to provide monochromatic color border portions of the regions. Specifically, a monochrome red border 1210 is applied in the border portions of the white triangle 1206 at the boundaries with each of the backgrounds (1202 and 1204), a monochrome blue border 1212 is applied in the border portions of the blue-green background 1204 at the boundaries with each of the other two regions (1202 and 1206), and a monochrome red border 1214 is applied in the border portions of the purple background 1202 at the boundaries with each of the other two regions (1204 and 1206).

The monochromatic borders are determined by identifying regions and their boundaries based on color data, determining the nearest primary color for border portions, and modifying those border portions to use only the nearest primary color as defined in a color space such as RGB or HSV. This technique reduces color breakup artifacts by eliminating the sequential display of multiple primary colors at region boundaries during rapid eye movements.

In some examples, the regions (1202, 1204, and 1206) are first identified by performing a Fourier transform across the first display configuration image 1200 to identify edges between different colored regions, such as objects in a scene. These edges are the locations where color break up is most likely to be perceived during a saccade or other eye movement: for example, the high green color values (G=255) of the pixels near the edge of the white triangle 1206 present a very sharp, high-frequency change from the very low green color values (G=0) of the pixels near the edge of the purple background 1202. As a result, rapid eye movement while looking at the first display configuration image 1200 can result in the perception of a green fringe extending from the white triangle 1206 into the purple background 1202 and/or red and blue fringes extending from the purple background 1202 into the white triangle 1206, depending on the direction of the eye movement and other factors. Thus, regions of largely similar color can be identified, and the boundaries between those regions can be identified, based on the Fourier transform of the color values of the pixels of the image.

After identifying the regions and their boundaries, the system determines the nearest primary color for the border portions of each region. The border portions can be considered to be a portions extending a partial width into the region from the boundary. In some examples, the width of the border regions is a fixed number of pixels, such as 4 or 5 pixels of width. In some examples, the width of the border regions can be scaled based on one or more factors, such as the estimated saccade size. For each region, or for each border portion of each region, the system analyzes the RGB values of the pixels within the border portion and selects the closest primary color to some aggregate color value of the pixels of the border portion. The aggregate color value of a border portion can be determined as an average, a weighted average, a median, or any other suitable averaging or aggregating function. The RGB values of this aggregated color value can then be compared to determine a closest primary color in the RGB color space. In some examples, the highest of the three R, G, and B values of the aggregate color value indicates the closest primary color. After the closest primary color is identified, the border portion is displayed as a monochrome border portion: either pure red (RGB 255, 0,0), pure green (RGB 0,255,0), or pure blue (RGB 0,0,255). In cases where two or three of the color values are identical (e.g., green and blue for the blue-green background 1204, or all three for the white triangle 1206), any suitable technique can be used to select a closest primary color. For example, at the boundary between the white triangle 1206 and the blue-green background 1204, the system detects the blue-green's equally strong green and blue components (RGB 0, 200, 200) and applies a selection heuristic to convert the border region (e.g., a region 4-5 pixels wide) into a monochrome blue border 1212 (RGB 0,0,255). Similarly, where the purple background 1202 meets the other two regions, the system detects that the purple background 1202 has a highest red value (RGB 150, 0, 130) and converts the border portions of the purple background 1202 into a monochrome red border 1214 (RGB 255,0,0), as red is the nearest primary color to the purple color in RGB color space.

In some examples, the border modifications may be applied in conjunction with other display adjustments during detected saccades, such as reducing opacity, brightness, or contrast across the display, including non-border regions. The monochromatic borders help preserve edge definition while allowing dimming of middle and low spatial frequencies to reduce color breakup artifacts. In some examples, the width of the monochromatic borders may be adjusted based on factors such as the magnitude of detected eye movement. For example, the default border width of 4 or 5 pixels can be reduced to 2 pixels for small saccades of less than 5 degrees, and/or can be increased to 8 pixels for large saccades of more than 15 degrees. It will be appreciated that these pixel widths and degree measurements are provided as examples, and different example implementations can use any suitable values.

FIG. 13 is a block diagram of components of an XR display system 1300 configured to perform color breakup reduction and/or reduction of other motion artifacts during rapid eye movements.

The system includes an eye tracking subsystem 1302 using at least one eye tracking sensor 508 to generate eye tracking data 1314. The eye tracking data 1314 includes eye gaze data 1316 representing the gaze direction of the user's eye(s), and that can be processed to determine angular velocity and acceleration of eye movements.

A saccade detection subsystem 1308 processes the eye gaze data 1316 to detect rapid eye movements using one or more of the techniques described above, such as comparing angular velocity to velocity thresholds. The saccade detection subsystem 1308 also predicts saccade duration using one or more of the techniques described above, such as based on peak velocity and acceleration profiles.

The system includes a display configuration subsystem 1326 that receives visual content data 1306 and modifies display parameters during detected saccades using one or more of the techniques described above. In some examples, the display configuration subsystem 1326 interfaces with a filter controller 306 and projector controller 312 to implement display modifications through an XR display 300.

The filter controller 306 controls an optical filter 302 (shown in FIG. 3) to adjust opacity levels, allowing more or less environmental light to pass through during saccades. The projector controller 312 modifies projection parameters such as brightness and contrast of the displayed content, as well as color values of various regions and portions of regions of the frame, as described above.

The display configuration subsystem 1326 can implement one or more of the correction techniques described above, including: reducing overall opacity via the optical filter, decreasing projector LED power, modifying RGB values of rendered content, and applying monochromatic colors at region boundaries. These corrections can be applied during the predicted saccade duration and removed before saccade completion.

In some examples, the XR display system 1300 processes the eye tracking data 1314 and adjusts the displayed content with a latency under 8 milliseconds, allowing corrections to be applied to the display early in larger saccades that typically last from 20 to 200 milliseconds. In some examples, the corrections to the display focus on saccades larger than 10 degrees, where color breakup and/or other motion artifacts are most noticeable. Smaller saccades, such as those under 5 degrees, may not require correction.

FIG. 14 illustrates a method 1400 for reducing color breakup and/or other motion artifacts of a field sequential color display during rapid eye movement.

Although example operation are shown and described in a particular order and/or being implemented by a specific system or a specific component of a system, it will be appreciated that the operations can be performed in different orders and/or concurrently, and/or by different systems or components.

The method 1400 begins with operation 1402. Visual content is presented to a user's eye via an FSC display device (such as XR display 300) according to a first display configuration. First display configuration image 1200 of FIG. 12A provides an example of visual content displayed according to a first display configuration for normal or baseline, non-saccade, operation of the display to display visual content data 1306 by controlling the filter controller 306 and projector controller 312 according to a first display configuration implemented by the display configuration subsystem 1326. In some examples, the FSC display device operates by transmitting red, green, and blue primary colors in successive monochrome images at 120 Hz per color for a total refresh rate of 360 Hz.

At operation 1404, rapid eye movement (such as a saccade) is detected through processing of eye tracking data. In some examples, the saccade detection operation 1404 can involve analyzing angular velocity of gaze direction changes, with saccade onset identified when velocity exceeds 30-50 degrees per second.

At operation 1406, the duration of the detected rapid eye movement is predicted using relationships between saccade parameters. In some examples, the prediction operation 1406 utilizes the saccade main sequence relating peak velocity to duration, and/or analyzes acceleration profiles to estimate when deceleration will occur.

At operation 1408, the visual content is presented for the predicted duration of the rapid eye movement according to a second display configuration. The second display configuration is configured to reduce color break up and/or other motion artifacts during rapid eye movements. The second display configuration can include modification of one or more of the display parameters described above, such as brightness, contrast, opacity, and/or monochromatic borders. Second display configuration image 1208 provides an example of visual content displayed in accordance with a second display configuration that modifies the border portions of regions within the visual content to be monochromatic. In some examples, the display configuration subsystem 1326 applies the second display configuration to the visual content data 1306 to control the filter controller 306 and/or the projector controller 312.

At operation 1410, just prior to the anticipated duration of the rapid eye movement, the display device is returned to baseline normal operation, and the visual content is presented according to the first display configuration. It will be appreciated that the visual content can be time-varying visual content, such that the visual characteristics of the visual content presented at operations 1402, 1408, and 1410 can differ, as can the characteristics of the visual content presented during each of these operations.

FIG. 15 illustrates sub-operations of an example implementation of operation 1404 for detecting rapid eye movement in the method 1400 of FIG. 14 for reducing color breakup during saccades.

The steps of operation 1404 begin with operation 1502. Eye gaze data is processed (e.g., by the eye tracking subsystem 1302) to determine angular velocities of the gaze direction. In some examples, the eye tracking subsystem 1302 processes the eye tracking data 1314 with a low latency, such as under 20 milliseconds or under 8 milliseconds, to calculate the angular velocity of changes in the gaze direction 506 and adjust the operation of the display.

At operation 1504, the system determines whether the calculated angular velocity exceeds a first velocity threshold, such as velocity threshold 934. In some examples, the threshold is set between 30-50 degrees per second to identify saccade onset. If the angular velocity does not exceed the threshold, the saccade detection operation 1404 returns to operation 1502 to continue monitoring eye movements.

When the angular velocity is determined to exceed the first velocity threshold at operation 1504, the process proceeds to operation 1506 to detect onset of the rapid eye movement. Detection of saccade onset trigger subsequent operations of the method 1400, such as operation 1406.

FIG. 16 illustrates sub-operations of an example implementation of operation 1406 for predicting the duration of a rapid eye movement in a method 1400 for reducing color breakup and/or other motion artifacts during saccades.

The sub-operations begin with operation 1602. A peak velocity and/or peak acceleration of the angular velocity is determined. The system (e.g., saccade detection subsystem 1308 of the XR display system 1300) processes eye tracking data 1314 to identify when maximum velocity or acceleration is reached during the saccade.

At operation 1604, the saccade duration is predicted (e.g., by the saccade detection subsystem 1308) based on the detected peak velocity and/or peak acceleration. In some examples, the prediction utilizes the saccade main sequence, which describes the linear relationship between peak velocity and saccade duration. For example, when the same maximum velocity value is detected in two consecutive samples, indicating peak velocity has been reached, the system uses this peak value to estimate the total saccade duration.

In some examples, the duration prediction utilizes acceleration profiles, where peak acceleration occurs early in the saccade. The system can estimate the time of peak deceleration based on the detected peak acceleration, as saccade acceleration and deceleration profiles are approximately symmetrical. The predicted duration enables the system to begin reverting display modifications before saccade completion to reduce perceptibility of the corrections.

In some examples, the prediction operation 1406 focuses particularly on larger saccades (e.g., over 10 degrees) that typically last 60-200 milliseconds, where color breakup and/or other motion artifacts are most noticeable. For smaller saccades (e.g., under 10 degrees, or under 5 degrees) lasting around 20 milliseconds, the system may not implement corrections due to limited perception of color breakup and/or other motion artifacts, and due to system latency constraints.

Machine Architecture

FIG. 17 is a diagrammatic representation of a machine 1700 within which instructions 1702 (e.g., software, a program, an application, an applet, an app, or other executable code) for causing the machine 1700 to perform any one or more of the methodologies discussed herein may be executed. For example, the instructions 1702 may cause the machine 1700 to execute any one or more of the methods described herein. The instructions 1702 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1702, sequentially or otherwise, that specify actions to be taken by the machine 1700. Further, while a single machine 1700 is illustrated, the term “machine” shall also be taken to include a collection of machines that individually or jointly execute the instructions 1702 to perform any one or more of the methodologies discussed herein. In some examples, the machine 1700 may comprise both client and server systems, with certain operations of a particular method or algorithm being performed on the server-side and with certain operations of the particular method or algorithm being performed on the client-side.

The machine 1700 may include processors 1704, memory 1706, and input/output I/O components 1708, which may be configured to communicate with each other via a bus 1710. In an example, the processors 1704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1712 and a processor 1714 that execute the instructions 1702. The term “processor” is intended to include multi-core processors that may comprise two or more independent processors (sometimes referred to as “cores”) that may execute instructions contemporaneously. Although FIG. 17 shows multiple processors 1704, the machine 1700 may include a single processor with a single-core, a single processor with multiple cores (e.g., a multi-core processor), multiple processors with a single core, multiple processors with multiples cores, or any combination thereof.

The memory 1706 includes a main memory 1716, a static memory 1718, and a storage unit 1720, all accessible to the processors 1704 via the bus 1710. The main memory 1706, the static memory 1718, and the storage unit 1720 store the instructions 1702 embodying any one or more of the methodologies or functions described herein. The instructions 1702 may also reside, completely or partially, within the main memory 1716, within the static memory 1718, within machine-readable medium 1722 within the storage unit 1720, within at least one of the processors 1704 (e.g., within the processor's cache memory), or any suitable combination thereof, during execution thereof by the machine 1700.

The I/O components 1708 may include a wide variety of components to receive input, provide output, produce output, transmit information, exchange information, capture measurements, and so on. The specific I/O components 1708 that are included in a particular machine will depend on the type of machine. For example, portable machines such as mobile phones may include a touch input device or other such input mechanisms, while a headless server machine will likely not include such a touch input device. It will be appreciated that the I/O components 1708 may include many other components that are not shown in FIG. 17. In various examples, the I/O components 1708 may include user output components 1724 and user input components 1726. The user output components 1724 may include visual components (e.g., a display such as the XR display 300, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), the eye tracking sensor 508 and eye tracking subsystem 1302 for detecting eye gestures, and the like.

In further examples, the I/O components 1708 may include motion components 1728, environmental components 1730, or position components 1732, among a wide array of other components.

The motion components 1728 include acceleration sensor components (e.g., accelerometer), gravitation sensor components, rotation sensor components (e.g., gyroscope).

The environmental components 1730 include, for example, one or more externally-facing cameras (with still image/photograph and video capabilities) such as left camera 114 and right camera 116, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

Further, the camera system of the machine 1700 may include dual rear cameras (e.g., a primary camera as well as a depth-sensing camera), or even triple, quad or penta rear camera configurations on the front and rear sides of the machine 1700. These multiple cameras systems may include a wide camera, an ultra-wide camera, a telephoto camera, a macro camera, and a depth sensor, for example. In some examples, the camera system includes the left camera 114 and right camera 116, and/or the eye tracking sensor 508, the optical calibration sensor 310, and/or other optical sensors.

The position components 1732 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1708 further include communication components 1734 operable to couple the machine 1700 to a network 1736 or devices 1738 via respective coupling or connections. For example, the communication components 1734 may include a network interface component or another suitable device to interface with the network 1736. In further examples, the communication components 1734 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1738 may be another machine or any of a wide variety of peripheral devices (e.g., a peripheral device coupled via a USB).

Moreover, the communication components 1734 may detect identifiers or include components operable to detect identifiers. For example, the communication components 1734 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1734, such as location via Internet Protocol (IP) geolocation, location via Wi-Fi® signal triangulation, location via detecting an NFC beacon signal that may indicate a particular location, and so forth.

The various memories (e.g., main memory 1716, static memory 1718, and memory of the processors 1704) and storage unit 1720 may store one or more sets of instructions and data structures (e.g., software) embodying or used by any one or more of the methodologies or functions described herein. These instructions (e.g., the instructions 1702), when executed by processors 1704, cause various operations to implement the disclosed examples, including the interactive software application 1310 and the saccade detection subsystem 1308.

The instructions 1702 may be transmitted or received over the network 1736, using a transmission medium, via a network interface device (e.g., a network interface component included in the communication components 1734) and using any one of several well-known transfer protocols (e.g., hypertext transfer protocol (HTTP)). Similarly, the instructions 1702 may be transmitted or received using a transmission medium via a coupling (e.g., a peer-to-peer coupling) to the devices 1738.

Software Architecture

FIG. 18 is a block diagram 1800 illustrating a software architecture 1802, which can be installed on any one or more of the devices described herein. The software architecture 1802 is supported by hardware such as a machine 1804 that includes processors 1806, memory 1808, and I/O components 1810. In this example, the software architecture 1802 can be conceptualized as a stack of layers, where each layer provides a particular functionality. The software architecture 1802 includes layers such as an operating system 1812, libraries 1814, frameworks 1816, and applications 1818. The applications 1818 may include one or more interactive software applications 1310 as described herein. Operationally, the applications 1818 invoke API calls 1820 through the software stack and receive messages 1822 in response to the API calls 1820. The described examples and at least some of the functions of the subsystems and controllers thereof, including the projector controller 312, the filter controller 306, the eye tracking subsystem 1302, the saccade detection subsystem 1308, and/or the display configuration subsystem 1326, may be implemented by components in one or more layers of the software architecture 1802.

The operating system 1812 manages hardware resources and provides common services. The operating system 1812 includes, for example, a kernel 1824, services 1826, and drivers 1828. The kernel 1824 acts as an abstraction layer between the hardware and the other software layers. For example, the kernel 1824 provides memory management, processor management (e.g., scheduling), component management, networking, and security settings, among other functionalities. The services 1826 can provide other common services for the other software layers. The drivers 1828 are responsible for controlling or interfacing with the underlying hardware. For instance, the drivers 1828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1814 provide a common low-level infrastructure used by the applications 1818. The libraries 1814 can include system libraries 1830 (e.g., C standard library) that provide functions such as memory allocation functions, string manipulation functions, mathematic functions, and the like. In addition, the libraries 1814 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1814 can also include a wide variety of other libraries 1834 to provide many other APIs to the applications 1818.

The frameworks 1816 provide a common high-level infrastructure that is used by the applications 1818. For example, the frameworks 1816 provide various graphical user interface (GUI) functions, high-level resource management, and high-level location services. The frameworks 1816 can provide a broad spectrum of other APIs that can be used by the applications 1818, some of which may be specific to a particular operating system or platform.

In an example, the applications 1818 may include a home application 1836, a location application 1838, and a broad assortment of other applications such as a third-party application 1840. The applications 1818 are programs that execute functions defined in the programs. Various programming languages can be employed to create one or more of the applications 1818, structured in a variety of manners, such as object-oriented programming languages (e.g., Objective-C, Java, or C++) or procedural programming languages (e.g., C or assembly language). In a specific example, the third-party application 1840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1840 can invoke the API calls 1820 provided by the operating system 1812 to facilitate functionalities described herein.

CONCLUSION

Described examples of field sequential color display systems seek to provide technical solutions to one or more technical problems. In field sequential color displays that present red, green, and blue primary colors in successive monochrome images at high refresh rates (e.g., 120 Hz per color), rapid eye movements called saccades cause the sequential color images to fall at different positions on the retina, resulting in visible color breakup artifacts. Example systems described herein implement one or more coordinated approaches to reduce color breakup by using eye tracking having, e.g., <20 ms or <8 ms latency, to detect saccade onset when angular velocity exceeds 30-50°/s, thereby predicting saccade duration using main sequence relationships between peak velocity and duration. The examples systems may then temporarily reduce display brightness, contrast, and/or opacity via projector and/or optical filter controls during the predicted saccade duration. In some examples, the system applies monochromatic colors at region boundaries by identifying nearest primary colors, and focusing corrections on larger saccades (e.g., >10°) where artifacts are most noticeable.

In some examples, the system overcomes latency constraints through early detection of saccade onset using velocity thresholds, prediction of total saccade duration based on peak acceleration profiles, implementation of corrections before peak velocity is reached, use of symmetrical acceleration/deceleration relationships to time correction removal, and/or focus on larger saccades lasting 60-200 ms where there is sufficient time to apply corrections.

In some examples, the system preserves edge definition through identification of region boundaries in the visual content, application of monochromatic colors at edges based on nearest primary colors, selective dimming of middle and low spatial frequencies while maintaining edge contrast, and leveraging saccadic suppression which makes users less sensitive to luminance changes during saccades.

In optical see-through displays, where the real-world background is visible and cannot be modified to reduce color breakup perception, the described examples can address this limitation through control of optical filter opacity to modulate environmental light transmission, adjustment of projector LED power to balance virtual content visibility, RGB value modification of rendered content, and/or combined application of opacity control and monochromatic edges. In some examples, the saccade correction techniques described herein can be combined with, or used in conjunction with, techniques for correcting displayed content based on detected or estimated head movements of a viewer of the display.

In some examples, a saccade correction system as described herein can be combined with head movement correction. In one example implemented on the example platforms shown in FIG. 13 and FIG. 17, data from motion components 1728 of a head-worn device can be integrated with the eye tracking data to create a comprehensive movement compensation system. The motion components 1728, which can include acceleration sensors, gravitation sensors, and rotation sensors (e.g., gyroscopes), can detect head movements that occur simultaneously with saccades. When both head and eye movements are detected, the system can apply a coordinated correction strategy that accounts for the combined displacement effect on the retina. For example, if a user performs a saccade while simultaneously turning their head, the system can analyze the combined angular velocity and acceleration profiles from both the eye tracking subsystem 1302 and motion components 1728 to predict the total duration and trajectory of the combined movement. The display configuration subsystem 1326 can then implement appropriate corrections, such as reducing opacity, applying monochromatic edges, and/or adjusting brightness/contrast based on the predicted combined movement pattern rather than treating the eye and head movements as separate events. In some cases, this integrated approach may be used in XR applications where users naturally combine head and eye movements when interacting with virtual content overlaid on real-world environments.

Specific examples are now described.

Example 1 is a system, comprising: at least one processor; and a memory storing instructions that, when executed by the at least one processor, configure the system to perform operations comprising: presenting visual content to an eye via a field sequential color (FSC) display device according to a first display configuration; detecting a rapid eye movement of the eye; predicting a duration of the rapid eye movement; presenting the visual content via the FSC display device during the predicted duration of the rapid eye movement according to a second display configuration, the second display configuration being configured to reduce a motion artifact during eye movement; and after the predicted duration of the rapid eye movement, presenting the visual content via the FSC display device according to the first display configuration.

In Example 2, the subject matter of Example 1 includes, wherein: the motion artifact comprises color break up.

In Example 3, the subject matter of Examples 1-2 includes, wherein: the second display configuration comprises reducing an opacity of the visual content.

In Example 4, the subject matter of Example 3 includes, wherein: the FSC display device is at least partially transparent, such that the eye can see a real-world visual field through the display; the FSC display device comprises a optical filter interposed between the visual content and the real-world visual field, the optical filter being controllable by the system to adjust an opacity of the optical filter; and the reducing of the opacity of the visual content comprises reducing the opacity of the optical filter.

In Example 5, the subject matter of Examples 1~4 includes, wherein: the second display configuration comprises reducing a brightness of the visual content.

In Example 6, the subject matter of Examples 1-5 includes, wherein: the second display configuration comprises reducing a contrast of the visual content.

In Example 7, the subject matter of Examples 1-6 includes, wherein: the FSC display device displays the visual content as a temporal sequence of monochromatic color images; and the second display configuration comprises modifying at least one region of the visual content to display a monochromatic color in a border portion of the region bordering an other region of the visual content.

In Example 8, the subject matter of Example 7 includes, wherein: the modifying of the at least one region comprises: identifying the at least one region and the other region based on color data of the visual content; identifying the at least one border portion of the region; determining a nearest monochromatic color for the at least one border portion based on color data of the at least one border portion; and modifying the color data of the at least one border portion to include only the nearest monochromatic color.

In Example 9, the subject matter of Examples 1-8 includes, wherein: the detecting of the rapid eye movement comprises: processing eye gaze data to determine an angular velocity of a change in direction of a gaze direction of the eye; and in response to determining that the angular velocity is over a first velocity threshold, detecting an onset of the rapid eye movement.

In Example 10, the subject matter of Example 9 includes, wherein: the predicting of the duration of the rapid eye movement comprises: detecting a peak velocity of the angular velocity; and predicting the duration based on the peak velocity.

In Example 11, the subject matter of Examples 9-10 includes, wherein: the predicting of the duration of the rapid eye movement comprises: detecting a peak acceleration of the angular velocity; and predicting the duration based on the peak acceleration.

In Example 12, the subject matter of Example 11 includes, wherein: the peak acceleration occurs at a peak acceleration time; and the predicting of the duration based on the peak acceleration comprises: predicting, based on the peak acceleration, a peak deceleration time at which a deceleration of the angular velocity reaches a peak deceleration, the duration being predicted based on the peak acceleration time and the peak deceleration time.

In Example 13, the subject matter of Examples 9-12 includes, wherein: the predicting of the duration of the rapid eye movement comprises: in response to determining that the angular velocity is below a second velocity threshold, detecting an offset of the rapid eye movement, the duration being predicted based on the onset and the offset of the rapid eye movement.

In Example 14, the subject matter of Examples 1-13 includes, the FSC display device; and an eye tracking subsystem to generate eye tracking data used for the detecting of the rapid eye movement and predicting the duration.

Example 15 is a processor-implemented method, comprising: presenting visual content to an eye via a field sequential color (FSC) display device according to a first display configuration; detecting a rapid eye movement of the eye; predicting a duration of the rapid eye movement; presenting the visual content via the FSC display device during the predicted duration of the rapid eye movement according to a second display configuration, the second display configuration being configured to reduce a motion artifact during eye movement; and after the predicted duration of the rapid eye movement, presenting the visual content via the FSC display device according to the first display configuration.

In Example 16, the subject matter of Example 15 includes, wherein: the motion artifact comprises color break up.

In Example 17, the subject matter of Examples 15-16 includes, wherein: the second display configuration comprises reducing at least one of: a brightness of the visual content; a contrast of the visual content; or an opacity of the visual content.

In Example 18, the subject matter of Examples 15-17 includes, wherein: the FSC display device displays the visual content as a temporal sequence of monochromatic color images; and the second display configuration comprises modifying at least one region of the visual content to display a monochromatic color in a border portion of the region bordering an other region of the visual content.

In Example 19, the subject matter of Examples 15-18 includes, wherein: the detecting of the rapid eye movement comprises: processing eye gaze data to determine an angular velocity of a change in direction of a gaze direction of the eye; and in response to determining that the angular velocity is over a first velocity threshold, detecting an onset of the rapid eye movement.

Example 20 is a non-transitory computer-readable storage medium, the computer-readable storage medium including instructions that when executed by at least one processor of a system, cause the system to perform operations comprising: presenting visual content to an eye via a field sequential color (FSC) display device according to a first display configuration; detecting a rapid eye movement of the eye; predicting a duration of the rapid eye movement; presenting the visual content via the FSC display device during the predicted duration of the rapid eye movement according to a second display configuration, the second display configuration being configured to reduce color break up during eye movement; and after the predicted duration of the rapid eye movement, presenting the visual content via the FSC display device according to the first display configuration.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Other technical features may be readily apparent to one skilled in the art from the following figures, descriptions, and claims.

Glossary

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system, comprising:

at least one processor; and a memory storing instructions that, when executed by the at least one processor, configure the system to perform operations comprising:

presenting visual content to an eye via a field sequential color (FSC) display device according to a first display configuration in which the visual content is displayed as a temporal sequence of monochromatic color images;

detecting a rapid eye movement of the eye;

predicting a duration of the rapid eye movement;

presenting the visual content via the FSC display device during the predicted duration of the rapid eye movement according to a second display configuration, the second display configuration being configured to reduce a motion artifact during eye movement by modifying a first region of the visual content to display a monochromatic color in a border portion of the first region bordering a second region of the visual content; and after the predicted duration of the rapid eye movement, presenting the visual content via the FSC display device according to the first display configuration.

2. The system of claim 1, wherein:

the motion artifact comprises color break up.

3. The system of claim 1, wherein:

the second display configuration comprises reducing an opacity of the visual content.

4. The system of claim 3, wherein:

the FSC display device is at least partially transparent, such that the eye can see a real-world visual field through the display;

the FSC display device comprises an optical filter interposed between the visual content and the real-world visual field, the optical filter being controllable by the system to adjust an opacity of the optical filter; and the reducing of the opacity of the visual content comprises reducing the opacity of the optical filter.

5. The system of claim 1, wherein:

the second display configuration comprises reducing a brightness of the visual content.

6. The system of claim 1, wherein:

the second display configuration comprises reducing a contrast of the visual content.

7. The system of claim 1, wherein:

the modifying of the at least one region comprises:

identifying the first region and the second region based on color data of the visual content;

identifying the border portion of the first region;

determining a nearest monochromatic color for the border portion based on color data of the border portion; and modifying the color data of the border portion to include only the nearest monochromatic color.

8. The system of claim 1, wherein:

the detecting of the rapid eye movement comprises:

processing eye gaze data to determine an angular velocity of a change in direction of a gaze direction of the eye; and in response to determining that the angular velocity is over a first velocity threshold, detecting an onset of the rapid eye movement.

9. The system of claim 8, wherein:

the predicting of the duration of the rapid eye movement comprises:

detecting a peak velocity of the angular velocity; and predicting the duration based on the peak velocity.

10. The system of claim 8, wherein:

the predicting of the duration of the rapid eye movement comprises:

detecting a peak acceleration of the angular velocity; and predicting the duration based on the peak acceleration.

11. The system of claim 10, wherein:

the peak acceleration occurs at a peak acceleration time; and the predicting of the duration based on the peak acceleration comprises:

predicting, based on the peak acceleration, a peak deceleration time at which a deceleration of the angular velocity reaches a peak deceleration, the duration being predicted based on the peak acceleration time and the peak deceleration time.

12. The system of claim 8, wherein:

the predicting of the duration of the rapid eye movement comprises:

in response to determining that the angular velocity is below a second velocity threshold, detecting an offset of the rapid eye movement, the duration being predicted based on the onset and the offset of the rapid eye movement.

13. The system of claim 1, further comprising:

the FSC display device; and an eye tracking subsystem to generate eye tracking data used for the detecting of the rapid eye movement and predicting the duration.

14. A processor-implemented method, comprising:

presenting visual content to an eye via a field sequential color (FSC) display device according to a first display configuration in which the visual content is displayed as a temporal sequence of monochromatic color images;

detecting a rapid eye movement of the eye;

predicting a duration of the rapid eye movement;

presenting the visual content via the FSC display device during the predicted duration of the rapid eye movement according to a second display configuration, the second display configuration being configured to reduce a motion artifact during eye movement by modifying a first region of the visual content to display a monochromatic color in a border portion of the first region bordering a second region of the visual content; and after the predicted duration of the rapid eye movement, presenting the visual content via the FSC display device according to the first display configuration.

15. The processor-implemented method of claim 14, wherein:

the motion artifact comprises color break up.

16. The processor-implemented method of claim 14, wherein:

the second display configuration comprises reducing at least one of:

a brightness of the visual content;

a contrast of the visual content; or an opacity of the visual content.

17. The processor-implemented method of claim 14, wherein:

the modifying of the first region comprises:

identifying the first region and the second region based on color data of the visual content;

identifying the border portion of the first region;

determining a nearest monochromatic color for the border portion based on color data of the border portion; and modifying the color data of the border portion to include only the nearest monochromatic color.

18. The processor-implemented method of claim 14, wherein:

the detecting of the rapid eye movement comprises:

processing eye gaze data to determine an angular velocity of a change in direction of a gaze direction of the eye; and in response to determining that the angular velocity is over a first velocity threshold, detecting an onset of the rapid eye movement.

19. A non-transitory computer-readable storage medium, the computer-readable storage medium including instructions that when executed by at least one processor of a system, cause the system to perform operations comprising:

presenting visual content to an eye via a field sequential color (FSC) display device according to a first display configuration in which the visual content is displayed as a temporal sequence of monochromatic color images;

detecting a rapid eye movement of the eye;

predicting a duration of the rapid eye movement;

presenting the visual content via the FSC display device during the predicted duration of the rapid eye movement according to a second display configuration, the second display configuration being configured to reduce color break up during eye movement by modifying a first region of the visual content to display a monochromatic color in a border portion of the first region bordering a second region of the visual content; and after the predicted duration of the rapid eye movement, presenting the visual content via the FSC display device according to the first display configuration.

20. The non-transitory computer-readable storage medium of claim 19, wherein:

the modifying of the at least one region comprises:

identifying the first region and the second region based on color data of the visual content;

identifying the border portion of the first region;

determining a nearest monochromatic color for the border portion based on color data of the border portion; and modifying the color data of the border portion to include only the nearest monochromatic color.

* * * * *